United States Patent
Utsunomiya

[19]

[11] Patent Number: 6,115,221
[45] Date of Patent: *Sep. 5, 2000

[54] MAGNETIC HEAD SLIDER SUPPORT MECHANISM AND MAGNETIC DISK STORAGE

[75] Inventor: Motoyasu Utsunomiya, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/984,112

[22] Filed: Dec. 3, 1997

[30] Foreign Application Priority Data

Dec. 3, 1996 [JP] Japan .................................. 8-322460

[51] Int. Cl.[7] ........................................................ G11B 5/60
[52] U.S. Cl. .................................................... 360/245.1
[58] Field of Search ............................................ 360/104

[56] References Cited

U.S. PATENT DOCUMENTS

| 5,617,274 | 4/1997 | Ruiz ........................... 360/104 |
| 5,638,234 | 6/1997 | Hagen ......................... 360/104 |

FOREIGN PATENT DOCUMENTS

| 3-189976 | 8/1991 | Japan . |
| 5-234295 | 9/1993 | Japan . |
| 6-302043 | 10/1994 | Japan . |
| 8-77517 | 3/1996 | Japan . |
| 8-297814 | 11/1996 | Japan . |
| 9-92904 | 4/1997 | Japan . |

OTHER PUBLICATIONS

"Integrated Suspension", The Japan Society of Mechanical Engineers, Mar. 1994, pp. 689–691.

"A New Integrated Suspension for Pico–Sliders (Pico–Caps)", 1996 IEEE.

"Development of Integrated Suspension System for a Nanoslider with an MR Head Transducer", IEEE Transactions on Magnetics, vol. 29, No. 6, pp. 3924–3926, Nov. 1993.

*Primary Examiner*—George J. Letscher
*Attorney, Agent, or Firm*—Sughrue, Mion, Zinn, Macpeak & Seas, PLLC

[57] ABSTRACT

A magnetic head slider support mechanism includes a flexure, a load beam, and a tongue member. The flexure supports a slider on which a magnetic head is mounted. The load beam has one end connected to an actuator mechanism and the other end having the flexure and applies a load force to the slider. The load beam and the flexure are integrally formed by using one thin strip plate. The tongue member has a U-shaped cross-section and is bent from the strip plate toward the slider supported by the flexure. The tongue member has a distal end being in contact with a rear surface of the slider to support the slider.

11 Claims, 40 Drawing Sheets

CONTACT AREA : SMALL

CONTACT AREA : SMALL

SUPPORTING OF ROLLING MOTION BY FLANGE ON SLIDER SIDE

SUPPORTING OF PITCHING MOTION BY FLANGE ON LOAD BEAM SIDE

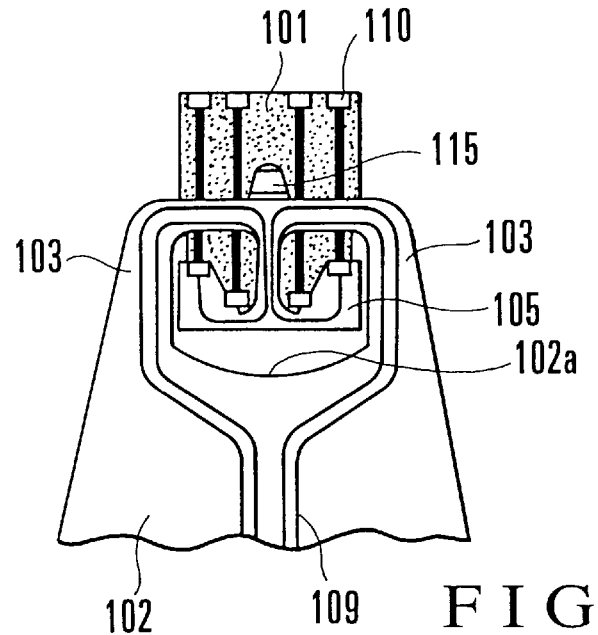
F I G. 8 A
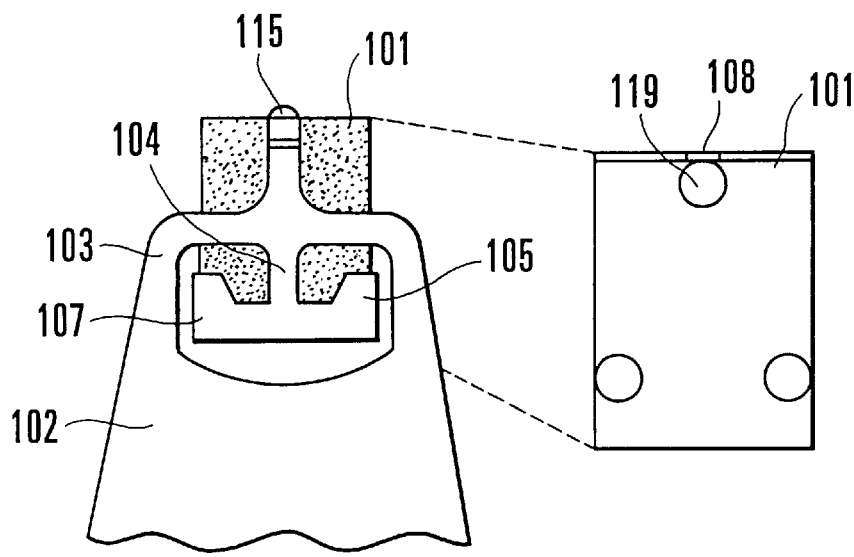
F I G. 8 B
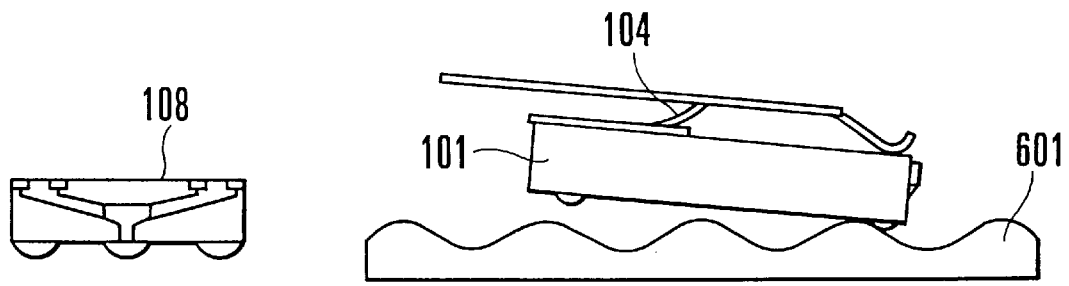
F I G. 8 C          F I G. 8 D

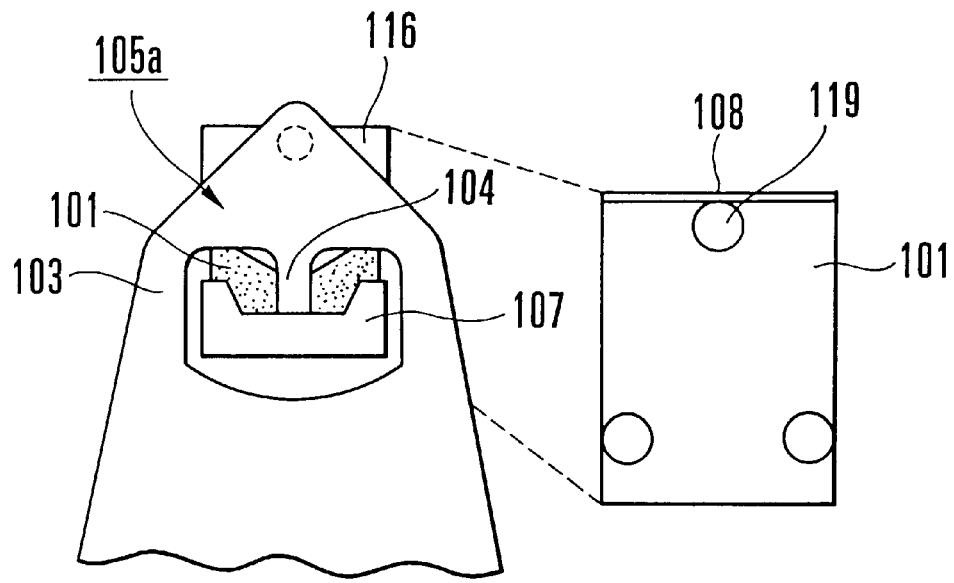
F I G. 13 A
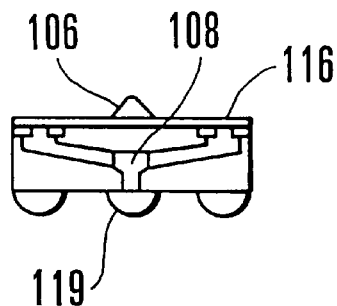
F I G. 13 B
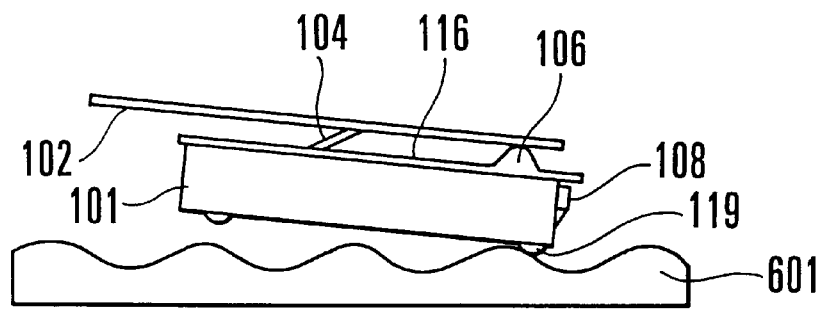
F I G. 13 C

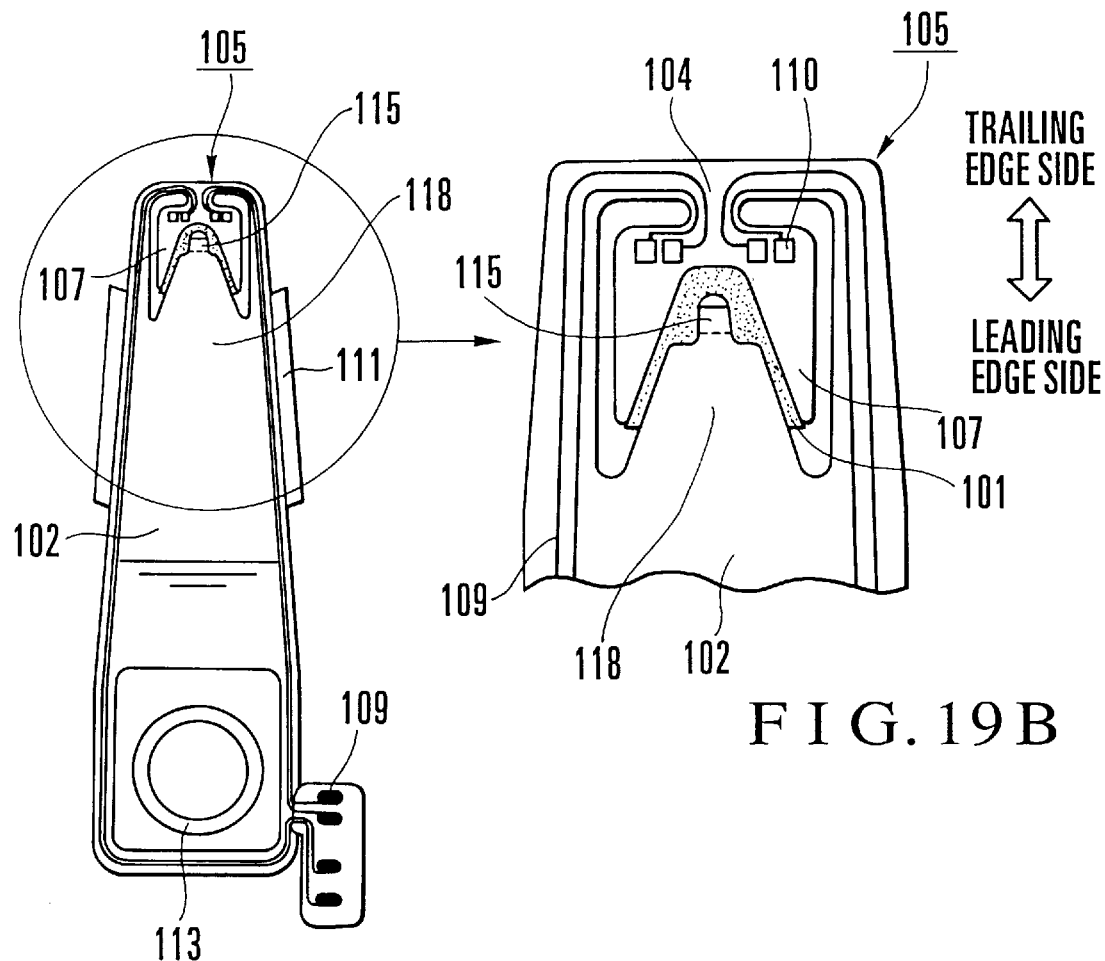
FIG. 19B
FIG. 19A
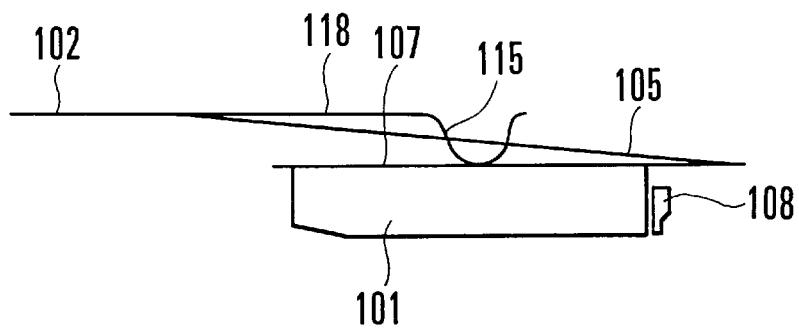
FIG. 19C

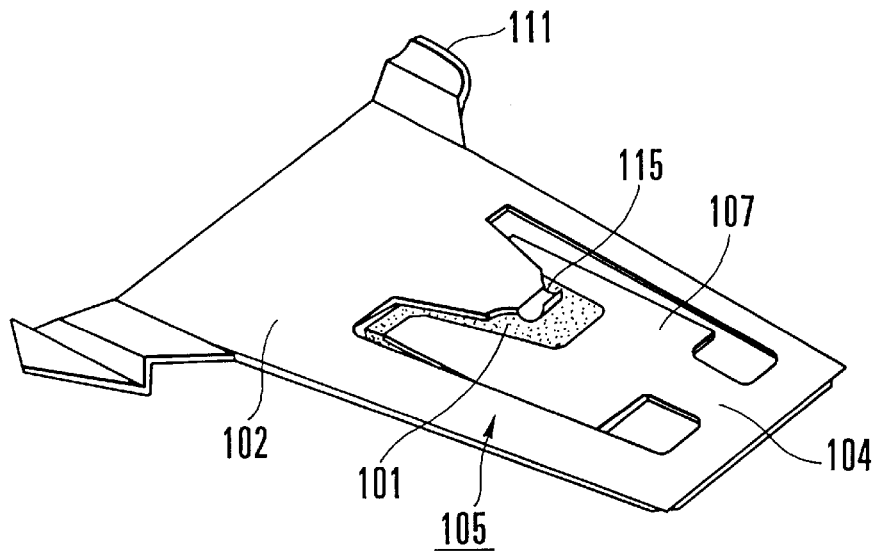
F I G. 20
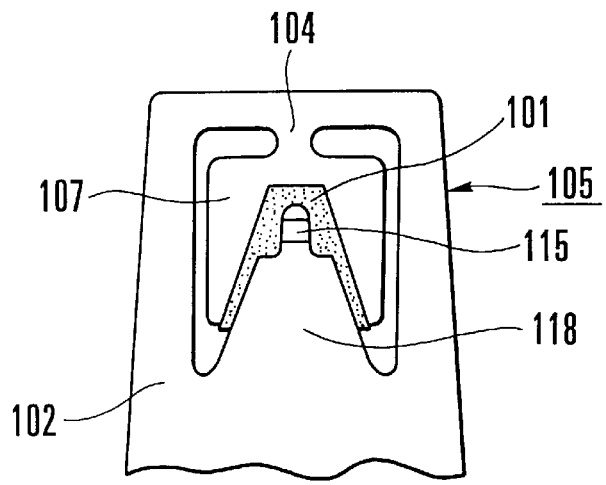
F I G. 21 A
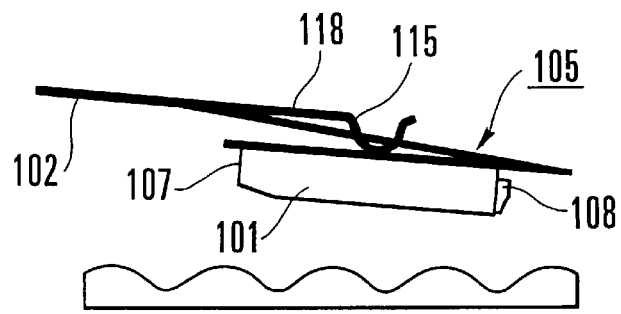
F I G. 21 B

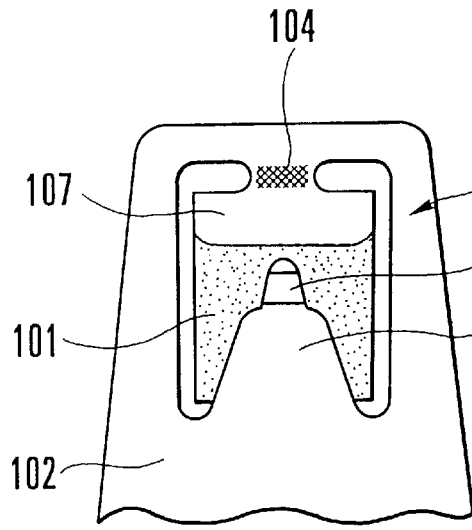
F I G. 22 A
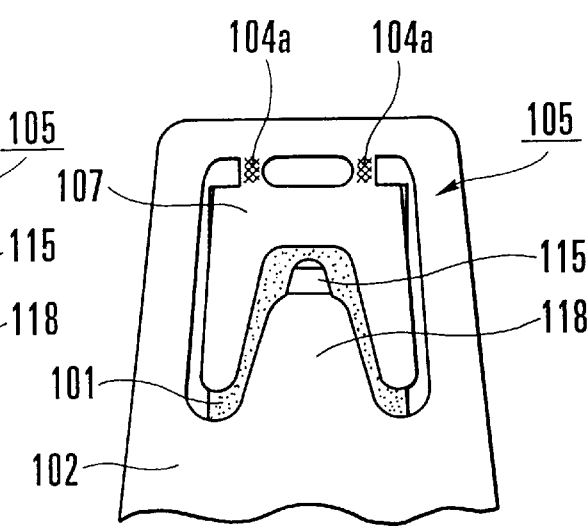
F I G. 22 B
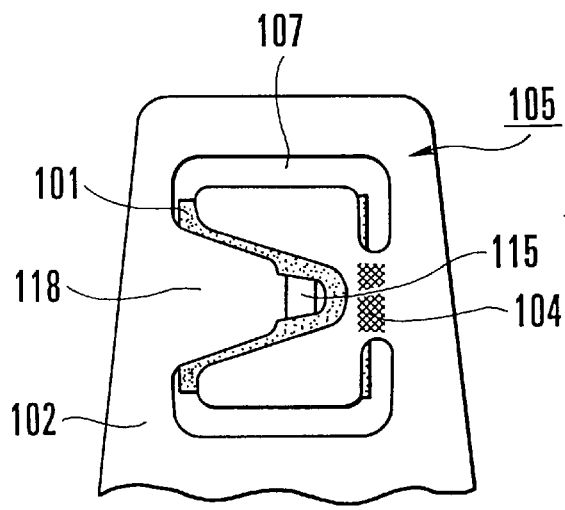
F I G. 22 C
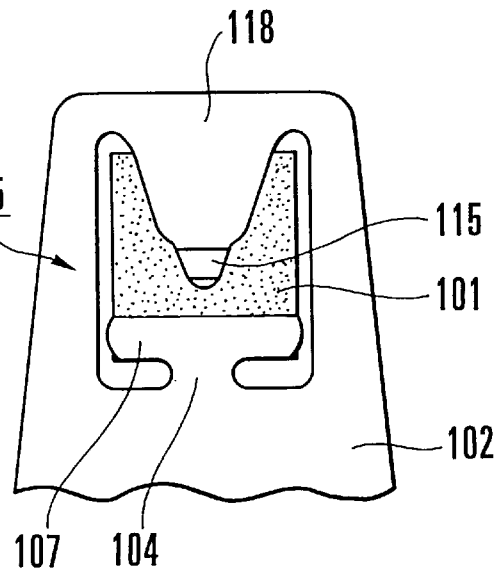
F I G. 22 D

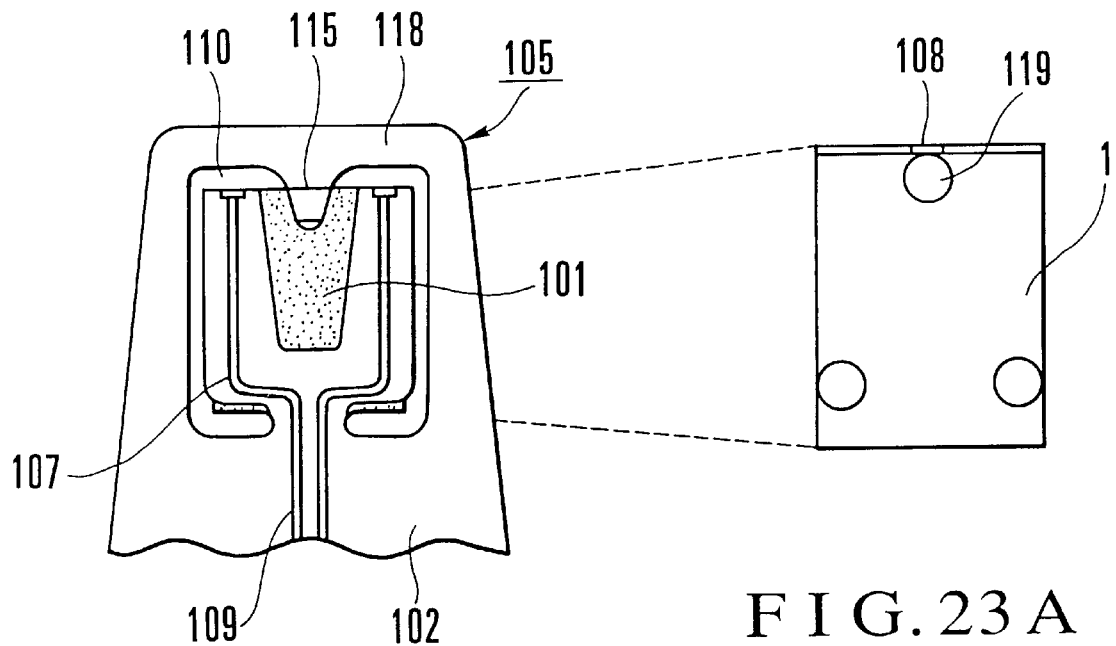
FIG. 23A
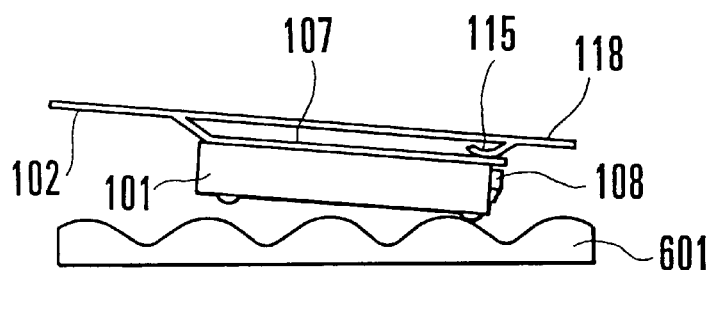 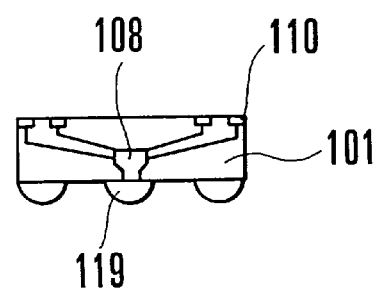
FIG. 23B    FIG. 23C

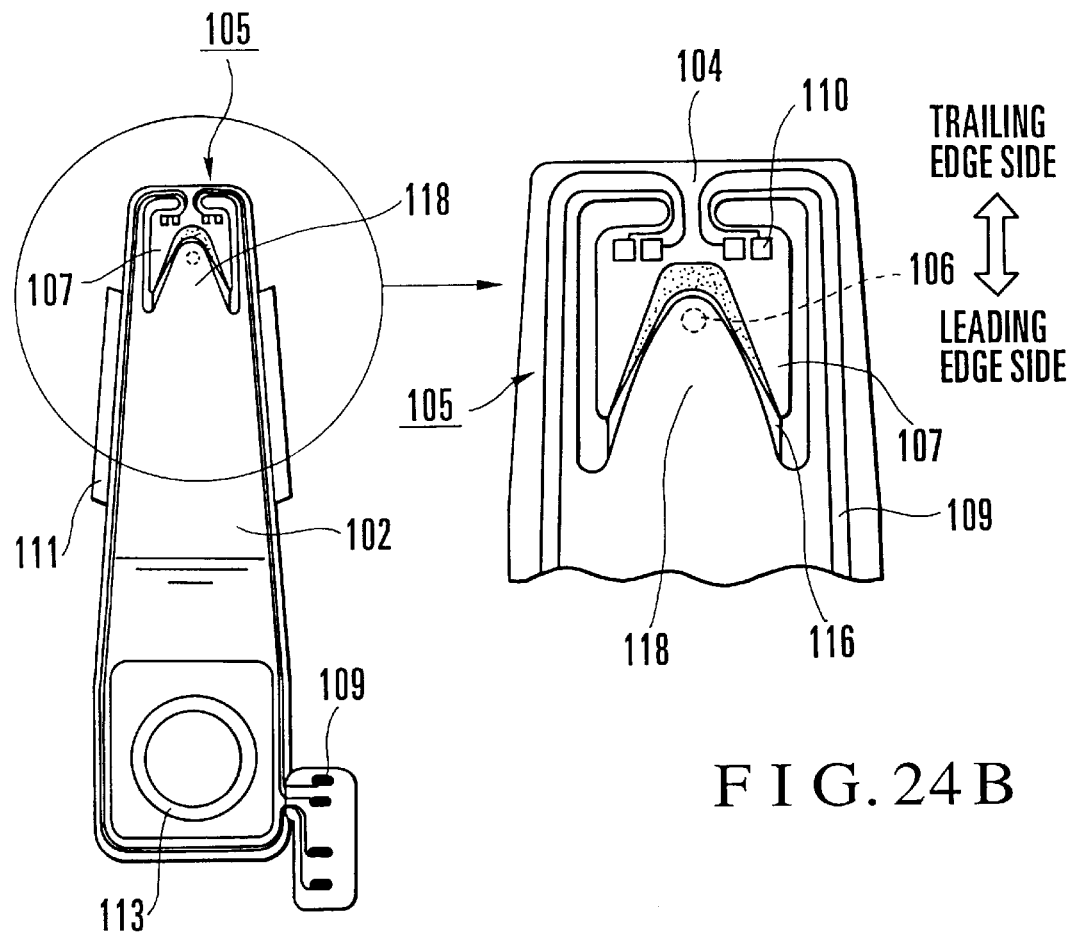
FIG. 24A
FIG. 24B
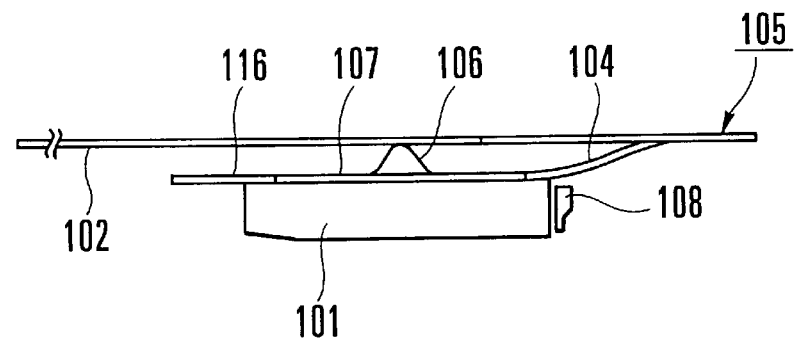
FIG. 24C

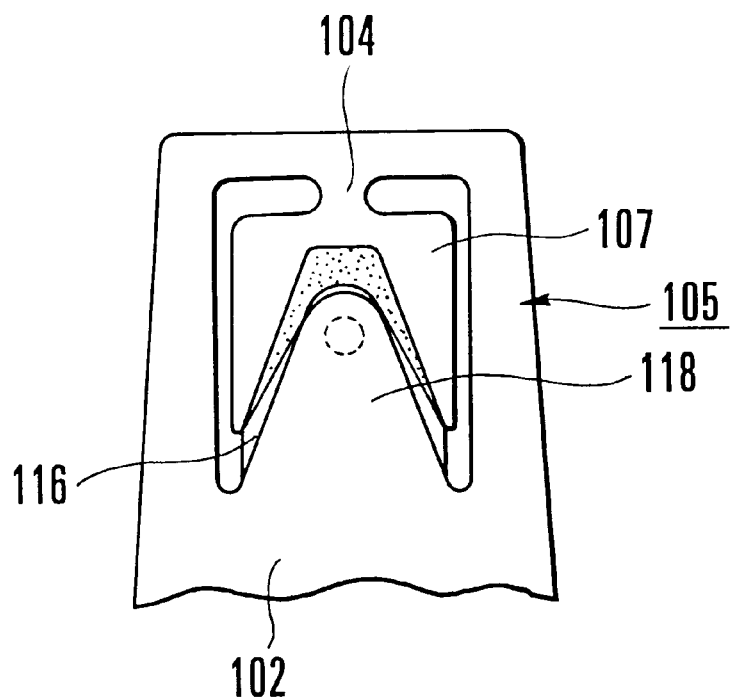
F I G. 26 A
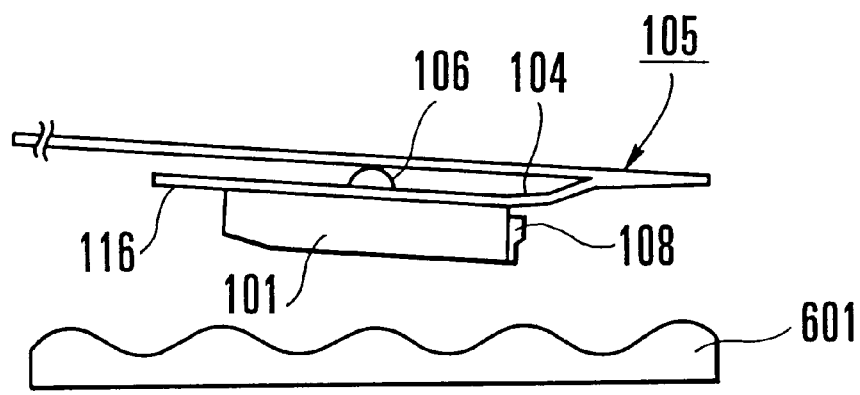
F I G. 26 B

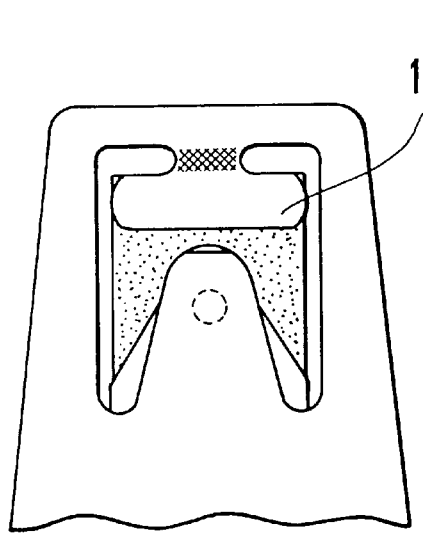
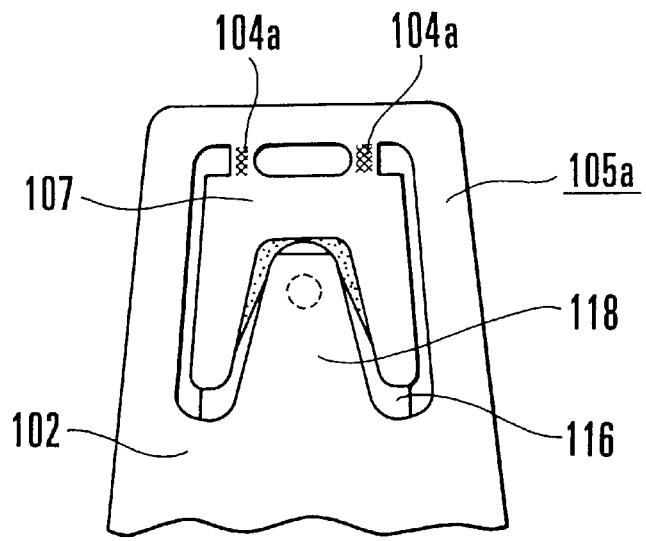
FIG. 27A    FIG. 27B
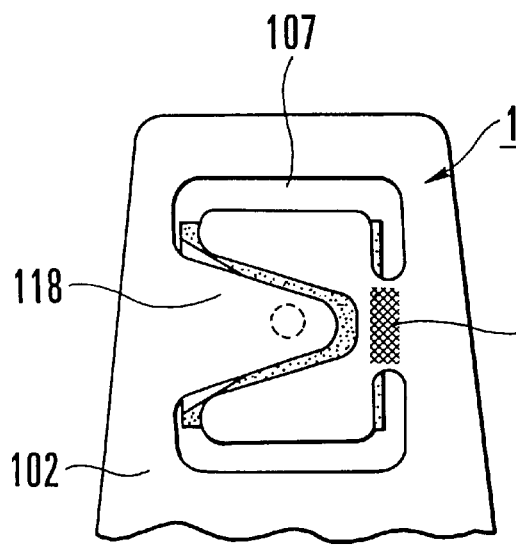
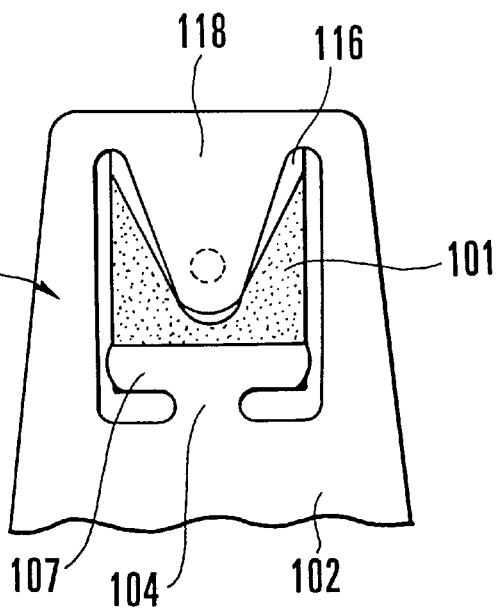
FIG. 27C    FIG. 27D

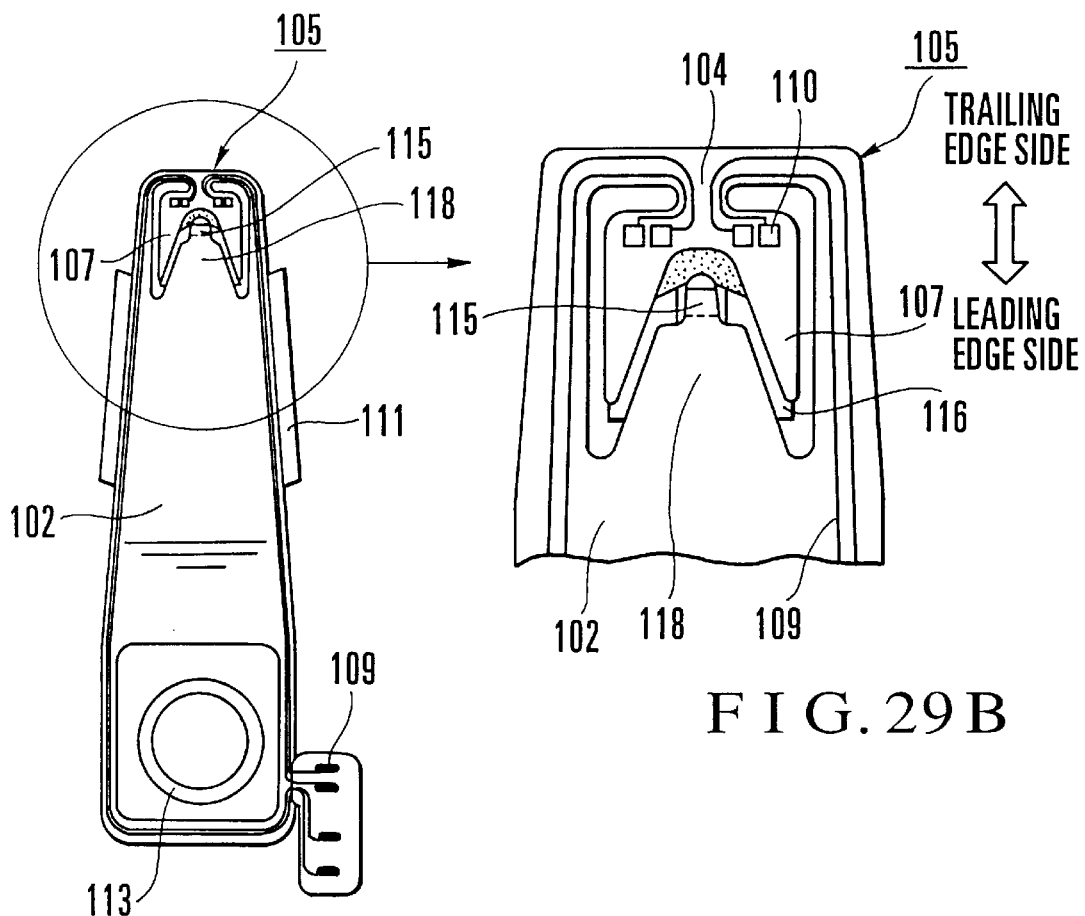
FIG. 29A
FIG. 29B
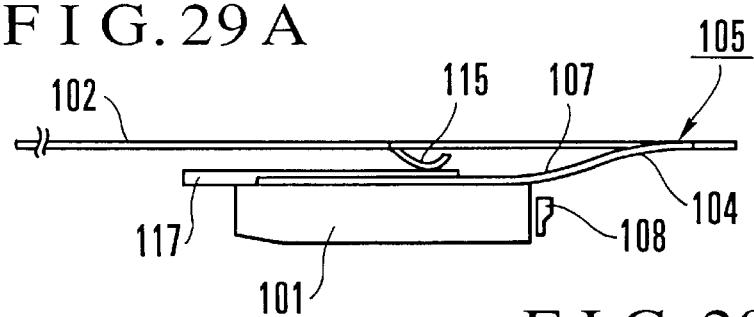
FIG. 29C
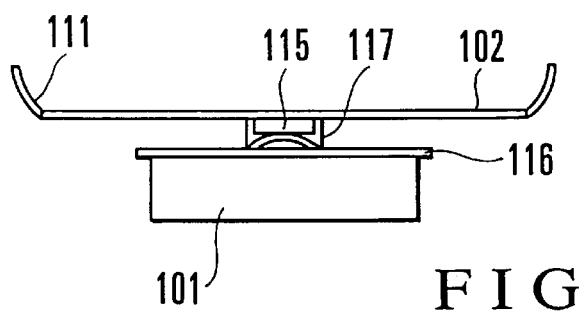
FIG. 29D

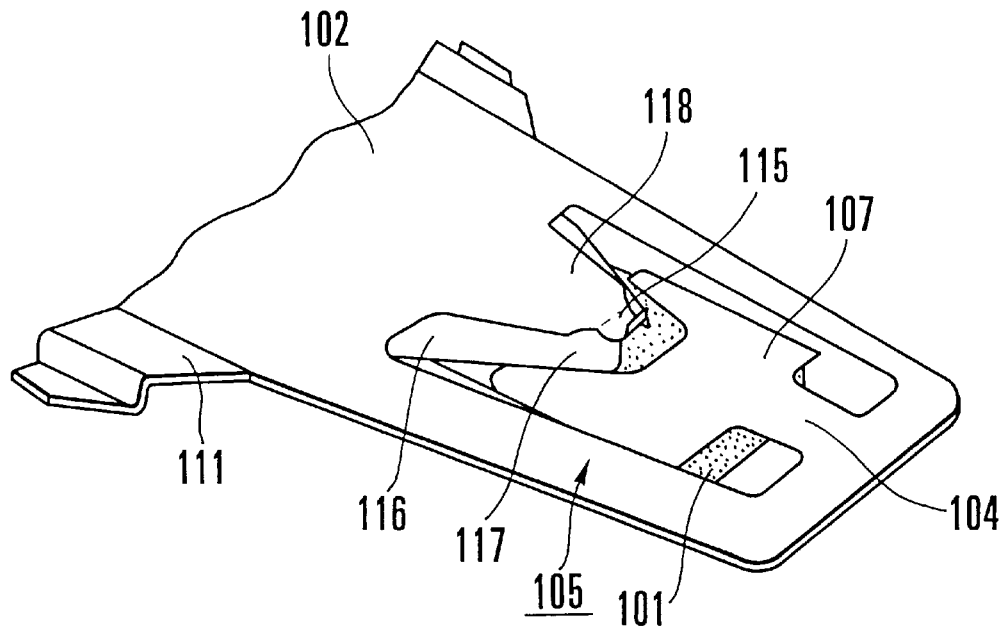
F I G. 30 A
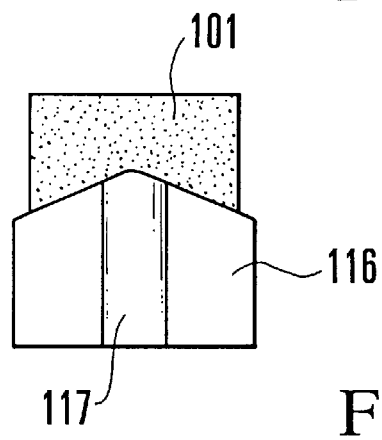
F I G. 30 B
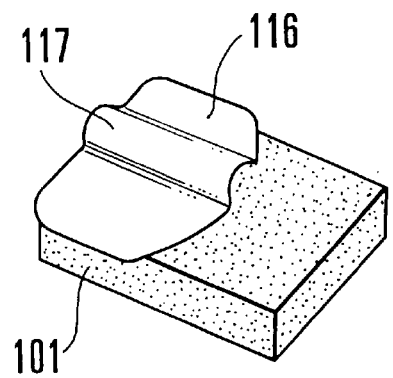
F I G. 30 C

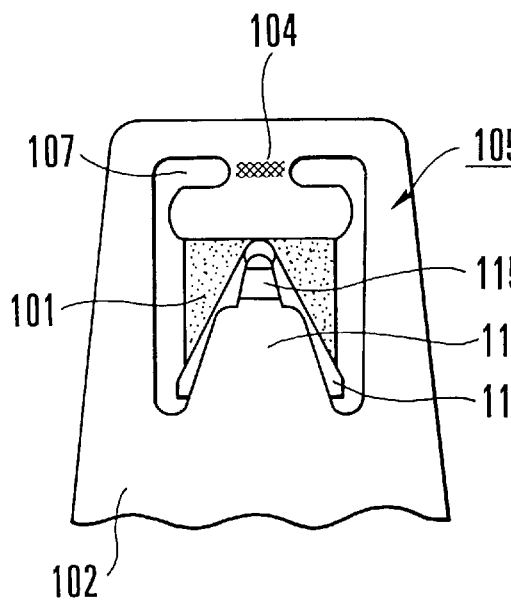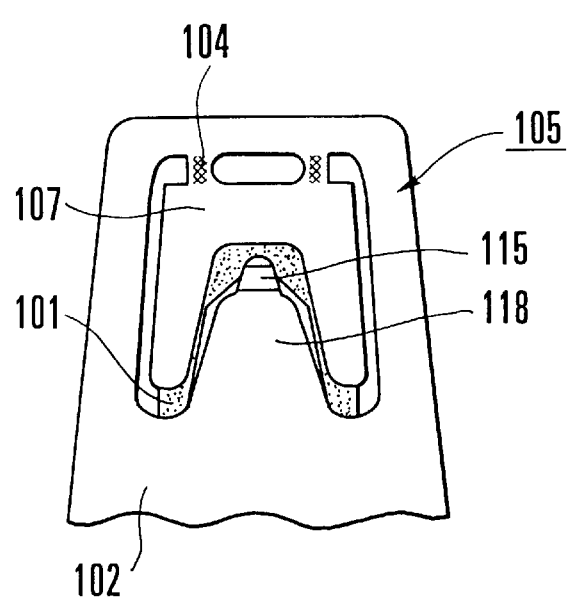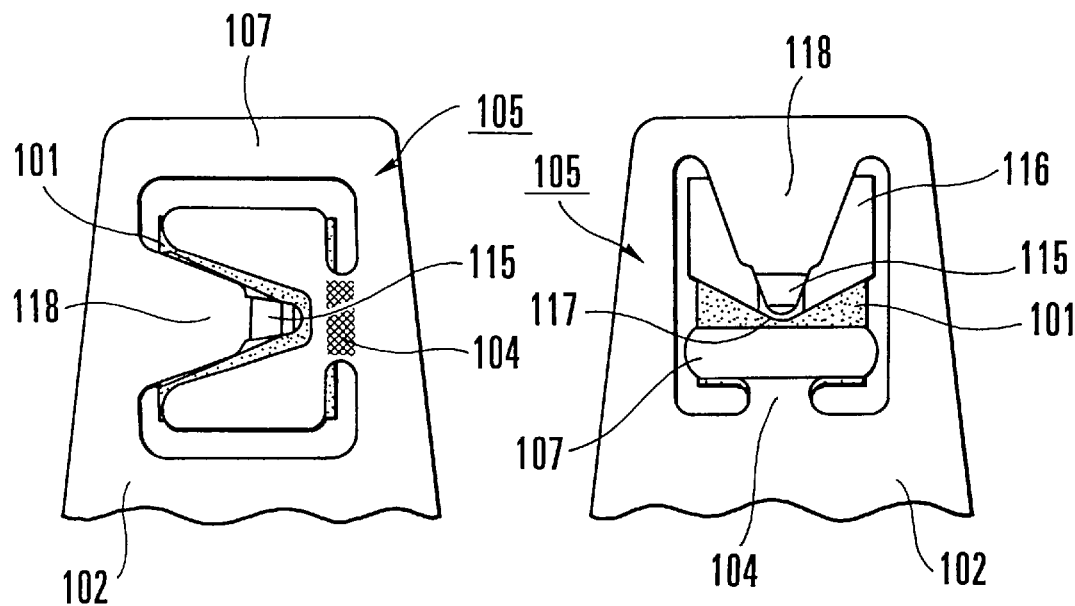
FIG. 32C  FIG. 32D

MAGNETIC HEAD SLIDER SUPPORT MECHANISM AND MAGNETIC DISK STORAGE

BACKGROUND OF THE INVENTION

The present invention relates to a magnetic head slider support mechanism used in a magnetic disk storage and a magnetic disk storage having the magnetic head slider support mechanism.

FIG. 36 shows a rotary actuator type positioning mechanism suited for high-speed, high-precision positioning of a magnetic head to a designated track on a disk. Referring to FIG. 36, a magnetic head slider support mechanism (to be referred to as a slider support mechanism hereinafter) 41 pivots in the seek direction indicated by the arrow to position the magnetic head mounted on the distal end of the mechanism. As slider support mechanisms 41, a slider support mechanism, like the one shown in FIGS. 37A and 37B, assembled from a load beam 2 and a flexure 5 which are separately manufactured, and a slider support mechanism, like the one shown in FIGS. 38A and 38B, obtained by integrally forming a load beam 2 and a flexure 5, are known.

In the slider support mechanism shown in FIG. 37A, the flexure 5 has a slider mount stage 7 in the longitudinal direction of the load beam 2, and a slider 1 is bonded to the stage 7. The slider 1 is point-supported by a pivot 6, which is attached to the load beam 2, near the barycentric position. The flexure 5 has a low stiffness and allows the motions of the slider 1 in a rolling direction RX and a pitching direction RY. With this structure, the slider 1 can flexibly turn on the pivot 6. Reference numeral 11 denotes a flange; and 13, a mount.

A wire-integrated type suspension (FIGS. 38A and 38B) suited for an MR head has been developed. This MR head uses a magnetoresistive effect and hence is used as a play-only head. The MR head is used together with a write head (inductive head). In this case, the number of signal lines doubles (four) as compared with a structure using a conventional magnetic head (write/read inductive head). For this reason, the rigidity of a signal line loop may act as a disturbance on a flying system to change the designed flying height of the slider or interference with stable flying unless forming of the signal lines is properly performed.

As the flying height and size of the slider decrease to meet the demand and higher recording densities, the forming design of the signal lines, in combination with a reduction in air bearing stiffness, poses delicate problems. For this reason, wire-integrated type suspensions have recently been developed (Japanese Patent Laid-Open Nos. 3-189976 and 5-234295). According to such a suspension, thin films as signal line patterns are directly formed on a load beam, and the signal line terminals of the magnetic head are directly bonded to the signal line patterns formed on the load beam surface, thereby removing disturbance factors from the flying system, and improving the assembly/working properties of the magnetic head support mechanism to attain a reduction in manufacturing cost.

FIGS. 38A and 38B show a wire-integrated type suspension. FIGS. 38A and 38B shows the upper and lower surfaces of the suspension, respectively. As shown in FIG. 38B, thin films as signal lines 9 are directly formed on a load beam 2. Reference numeral 14 denotes a mount base.

In such a wire-integrated type suspension, since thin films are formed as signal line patterns, the flexure portion of the magnetic head support mechanism inevitably has a flexure-integrated type structure instead of a conventional flexure/load beam assembly structure.

FIGS. 39A and 39B show the flexure portions of the above two types of slider support mechanisms. FIG. 39A shows the flexure portion of the slider support mechanism in FIGS. 37A and 37B, which is assembled from the separately manufactured load beam and flexure. FIG. 39B shows the flexure portion of the wire-integrated type slider support mechanism shown in FIGS. 38A and 38B. The flexure portion of the wire-integrated type suspension in FIG. 38B inevitably has a pivotless structure because the flexure 5 and the load beam 2 are integrally formed.

In the flexure portion having the pivot structure shown in FIG. 39A, the pivot 6 attached to the load beam 2 (or on the flexure side) allows the flexible slider 1 to roll/pitch. In the flexure portion having the pivotless structure shown in FIG. 39B, a pressure load acts on the slider 1 in the form of a surface-distributed load instead of an ideal point load. For this reason, the flying height of the slider 1 deviates from the designed flying height, or elastic deformation of the flexure portion causes a load loss to fail to obtain the designed load. Alternatively, since flexure vibrations are directly transmitted to the flying system (off the center of gravity), flying variations in the resonant frequency band appear after being amplified.

A slider support mechanism with a structure having the advantages of both the flexure portions shown in FIGS. 39A and 39B is disclosed in Japanese Patent Laid-Open No. 6-302043. FIG. 40 shows the structure of this mechanism. The same reference numerals in FIG. 40 denote the same parts as in FIG. 37. A beam portion 401 integrally formed with a load beam 2 is formed in the central portion of a flexure 5. A pivot 6 is formed in substantially the central portion of the beam portion 401. The pivot 6 has a spherical shape to be engaged with a convex opposing portion of a core (magnetic field generating means) 402, and hence is in point-contact with the core 402. With this structure, the core 402 can freely turn on the pivot 6.

The pivot of the flexure portion disclosed in Japanese Patent Laid-Open No. 6-302043 is formed by bulging using a mold. The slider support mechanism is mainly made of stainless steel. Since stainless steel exhibits noticeable work-hardening and great springback, when the pivot 6 is to be formed by bulging, a crease prevention region must be ensured around the pivot to prevent a crease, as shown in FIG. 41.

When a spherical pivot 6a shown in FIG. 42A is to be formed, a crease prevention region having an area about twice the molding area is required. To form a pivot used for a 50% slider suspension, therefore, a working region (crease prevention region) having a size of about 0.336 mm to 0.6 mm, which is about twice the diameter (0.168 mm to 0.3 mm) of the pivot, must be ensured. For this reason, it is difficult to reduce the size of the slider support mechanism, and especially the flexure portion.

When this technique is to be applied to a wire-integrated type suspension, in particular, wiring patterns must be formed avoiding the pivot portion and the crease prevention region. That is, the degree of freedom in wiring design is low.

In addition, to form a low-profile load beam, the height of a pivot must be decreased. If, however, the height of the pivot 6 is decreased, it is difficult to form a spherical pivot portion by molding. As shown in FIG. 42B, therefore, a low-profile pivot or flat pivot 6b is formed. As a result, the contact area with the slider 1 increases.

As the contact area with the slider 1 increases, an off-track error is caused for the following reason. When the magnetic head is sought over a recording medium 42, the slider 1 separates from the pivot 6 and is then moved greatly, resulting in a positional offset (slipstick). In this state, when the seeking operation is complete, the slider 1 comes into contact with the pivot 6 and keeps supporting it.

SUMMARY OF THE INVENTION

It is an object of the present invention to provide a magnetic head slider support mechanism which allows a reduction in size while the degree of freedom in wiring of a wire-integrated type suspension is kept high.

It is another object of the present invention to provide a low-profile magnetic head slider support mechanism which prevents an off-track error due to slipstick.

It is still another object of the present invention to provide a magnetic head slider support mechanism which is suited for a rotary actuator type magnetic head slider support mechanism, and how a low slider support stiffness (roll/pitch stiffness), which allows high tracking performance, while keeping a high seek stiffness.

In order to achieve the above objects, according to the present invention, there is provided a magnetic head slider support mechanism comprising a flexure for supporting a slider on which a magnetic head is mounted, a load beam having one end connected to an actuator mechanism and the other end having the flexure and applying a load force to the slider, the load beam and the flexure being integrally formed by using one thin strip plate, and a tongue member having a U-shaped cross-section and bent from the strip plate toward the slider supported by the flexure, the tongue member having a distal end being in contact with a rear surface of the slider to support the slider.

BRIEF DESCRIPTION OF THE DRAWINGS

FIGS. 8A to 8D are views showing modifications of the slider support mechanism according to the first embodiment of the present invention;

FIGS. 13A to 13C are views showing modifications of the slider support mechanism according to the second embodiment of the present invention;

FIGS. 19A to 19C are a plan view, an enlarged view of the main part, and a side view, respectively, of a slider support mechanism according to the fourth embodiment of the present invention;

FIG. 20 is a perspective view showing a flexure portion in the fourth embodiment of the present invention;

FIGS. 21A and 21B are views schematically showing the slider support mechanism according to the fourth embodiment of the present invention;

FIGS. 22A to 22D are views showing modifications of the slider support mechanism according to the fourth embodiment of the present invention;

FIGS. 23A to 23C are views showing modifications of the slider support mechanism according to the fourth embodiment of the present invention;

FIGS. 24A to 24C are a plan view, an enlarged view of the main part, and a side view, respectively, of a slider support mechanism according to the fifth embodiment of the present invention;

FIGS. 26A and 26B are views schematically showing the slider support mechanism according to the fifth embodiment of the present invention;

FIGS. 27A to 27D are views showing modifications of the slider support mechanism according to the fifth embodiment of the present invention;

FIGS. 29A to 29D are a plan view, an enlarged view of the main part, a side view, and a front view, respectively, of a slider support mechanism according to the sixth embodiment of the present invention;

FIGS. 30A to 30C are a perspective view of the slider support mechanism according to the sixth embodiment of the present invention, and a perspective view and a plan view of a slider, respectively;

FIGS. 32A to 32D are views showing modifications of the slider support mechanism according to the sixth embodiment of the present invention;

DESCRIPTION OF THE PREFERRED EMBODIMENTS

First Embodiment

FIGS. 4A, 4B, 4C, and 4D show a slider support mechanism according to the first embodiment of the present invention. FIGS. 5A and 5B show the slider support mechanism in FIGS. 4A to 4D.

Figures 4A, 4B:
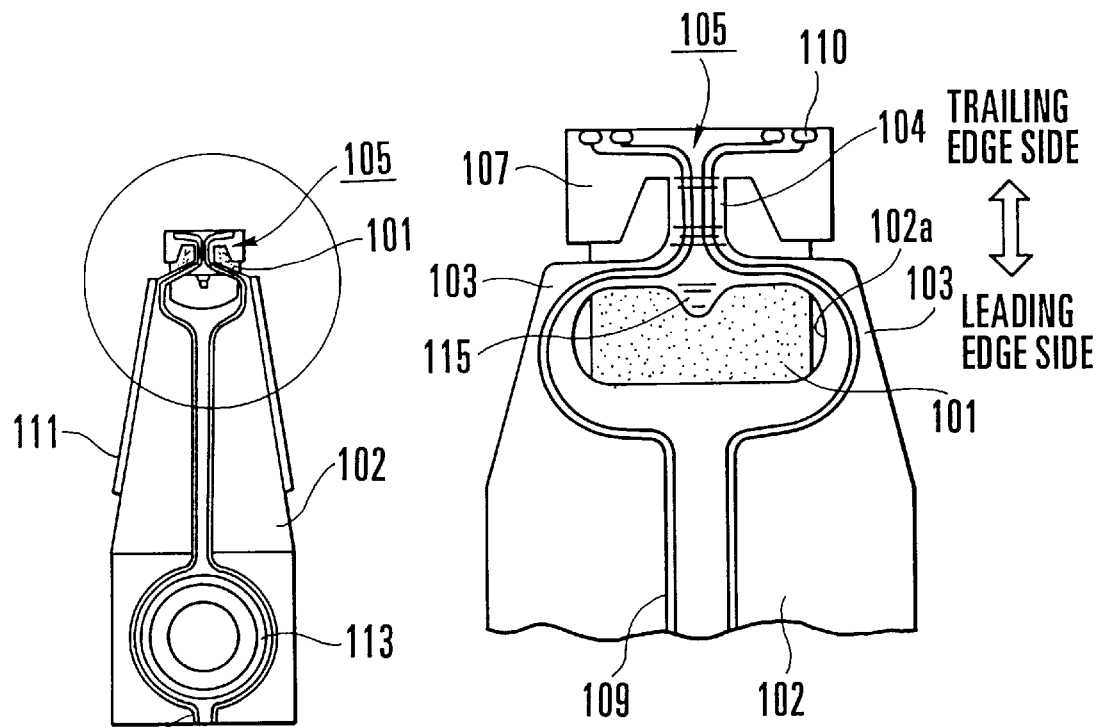
FIGS. 4A to 4D are a plan view, an enlarged view of the main part, a front view, and a side view, respectively, of a slider support mechanism according to the first embodiment of the present invention.
Figure 5A:
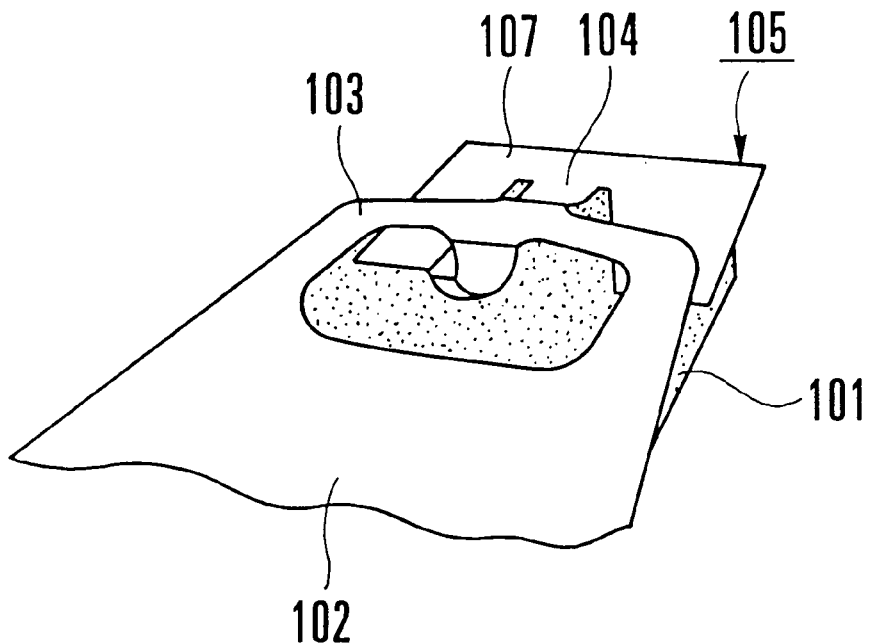
FIGS. 5A and 5B are perspective views of the main part of the slider support mechanism according to the first embodiment of the present invention.
Figure 5B:
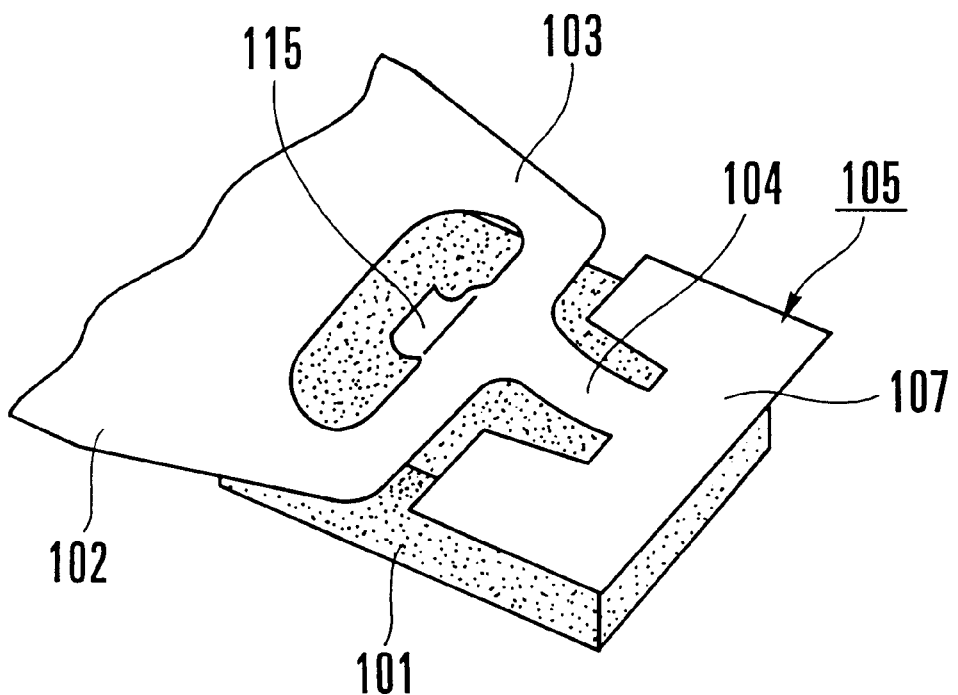

As shown in FIG. 4A, the slider support mechanism of the first embodiment is constituted by a flexure 105 for supporting a slider 101, and a load beam 102 for pressing the flexure 105. Flanges 111 are attached to the two sides of the load beam 102 to increase the stiffness. The proximal end portion of the load beam 102 is connected to an actuator mechanism (not shown) through a mount 113 so as to position the slider (to be described later) mounted on the distal end portion of the load beam 102 to a designated track on a magnetic disk. The load beam 102 and the flexure 105 are made of a thin strip plate such as a stainless steel plate, and are blanked in the following forms by pressing or the like.

Figure 4C:
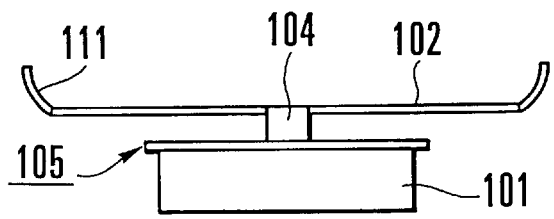
Figure 4D:
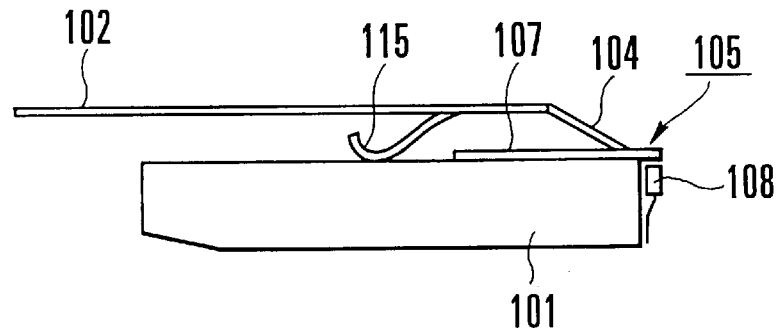

A pair of base arms 103 are formed on the distal end portion of the load beam 102 to extend from its two ends. As shown in FIG. 4B, the distal end portions of the base arms 103 are coupled to each other to form an almost elliptic opening portion 102a. As shown in FIG. 4D, a tongue member 115 having a U-shaped cross-section opposing the opening portion 102a and extending from the trailing edge to the leading edge side of the slider 101 (to be described later) is formed at the coupling portion of the base arms 103 to protrude so as to come into contact with the upper surface of the slider 101. The position of the opening 102a is preferably set such that the tongue member 115 is placed at the barycenter of the slider or the designed slider pressing position. In addition, the contact area with the slider 101 is preferably minimized by reducing the size of tongue member 115 to such an extent that a process allows, thereby making point-contact as ideal as possible.

In a conventional magnetic head support mechanism having a flexure/load beam assembly structure, since the pivot diameter is generally 0.16 mm or more, the width of the tongue member 115 may be set to a similar value at the contact portion with the slider 101. When the application of this mechanism to a wire-integrated type suspension is taken into consideration, the width of each base arm 103 is preferably set to 0.2 mm or more in consideration of the formation of signal line patterns.

As shown in FIGS. 5A and 5B, one connect arm 104 bent along the center line of the load beam 102 toward the trailing edge of the slider 101 in a direction to approach a magnetic disk extends from the coupling portion of the base arms 103. As shown in FIGS. 5A and 5B, a slider mount stage 107 separated into right and left portions and then extending up to a position where the stage does not interfere with the base arm 103 at a position where the width of the stage becomes equal to that of the slider 101 toward the leading edge side is formed at the distal end portion of the connect arm 104. That is, the E-shaped flexure 105 having the connect arm 104 and the slider mount stage 107 supported by the connect arm 104 is mounted on the distal end (trailing edge side of the slider 101) of the base arm 103. The slider 101 is bonded/fixed to the lower surface of the mount stage 107 of the flexure 105 to be parallel to the magnetic disk surface.

In this case, the width and length of the connect arm 104 greatly influence the support stiffness of the slider 101. As the connect arm 104 becomes thinner and longer, the support stiffness (roll/pitch stiffness) of the slider 101 can be reduced, but the seek stiffness also decreases. In this case, since a large resonance gain appears in a low frequency band, consideration must be given to tradeoff design for this portion to obtain performance corresponding to specifications.

Since the slider 101 is bonded/fixed to a portion of the flexure 105 other than the connect arm 104, a certain bonding area must be ensured. Ideally, this area is 30% or more of the slider projection area. In practice, however, even if this area is 10% or less of the slider projection area, a sufficient strength can be obtained. According to a pico-slider (1.25 mm (length)×1.0 mm (width)×0.30 mm (thickness)), for example, a conventional flexure-integrated type magnetic head slider support mechanism has a bonding area of 0.642 mm$^2$ (53.5% of the slider projection area). According to a recently released magnetic head slider support mechanism of the same type, satisfactory slider bonding is realized with a bonding area of 0.113 mm$^2$ (9.4% of the slider projection area).

When this structure is to be applied to a wire-integrated type suspension, to ensure a bonding space between signal line terminals 110 of the slider 101 and signal lines 109, the flexure 105 is preferably formed with a margin of about 0.2 to 0.4 mm in the longitudinal direction of the slider 101 beyond the trailing edge of the slider 101. Since the tongue member 115 is brought into contact with the rear surface of the slider 101, a level difference corresponding to the bending height of the tongue member 115 is caused between the base arm 103 and the slider mount stage 107, as shown in FIGS. 4C and 4D. For this reason, the connect arm 104 preferably has a pressed portion like the conventional magnetic head slider support mechanism. To prevent damage to the signal lines 109, however, the connect arm 104 may be deflected, instead of having a pressed portion, to absorb this level difference.

With the use of the magnetic head support mechanism having this structure, the flexure 105 and the load beam 102 can be integrally formed. This structure can therefore be easily applied to a wire-integrated type suspension in which the signal lines of the magnetic head are formed by forming a thin film on the surface of the load beam 102. In addition, since a suspension having a slider/pivot support structure, which has been used in a conventional flexure/load beam separation type disk storage, can be approximately realized with the tongue member 115, a flexible slider support stiffness and a proper load (pressing by a point load) on the slider 101 can be attained.

Figure 6A:
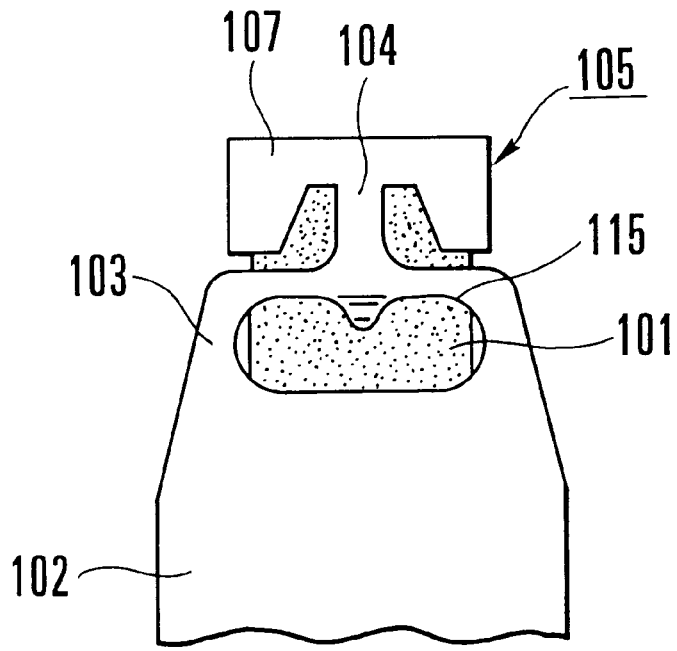
FIGS. 6A and 6B are views schematically showing the main part of the slider support mechanism according to the first embodiment of the present invention.
Figure 6B:
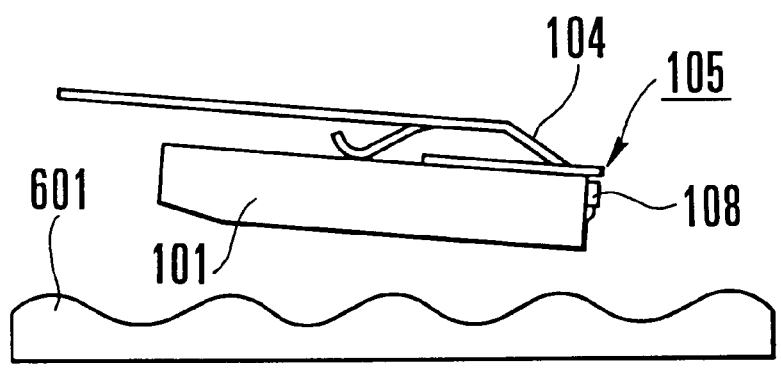

FIG. 6A schematically shows the relationship between the slider 101, the load beam 102, the base arm 103, and the flexure 105 which are the main components of the first embodiment. As shown in FIG. 6B, the slider 101 is bonded/fixed to the flexure 105 to oppose a recording medium 601, and is supported to follow the corrugations on the surface of the recording medium 601.

FIGS. 7A to 7C and 8A to 8D show modifications of the first embodiment.

First Modification

Figure 7A:
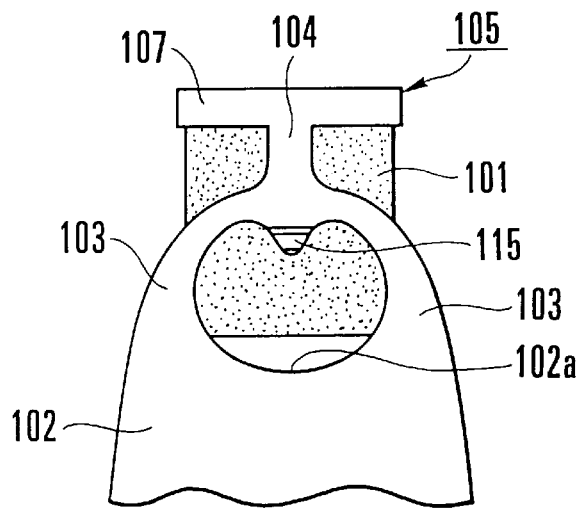
FIGS. 7A to 7C are views showing modifications of the slider support mechanism according to the first embodiment of the present invention.

The opening portion 102a formed in the distal end portion of the load beam 102 may have an arcuated shape like the one shown in FIG. 7A. According to the first modification shown in FIG. 7A, the E-shaped flexure 105 in the first embodiment is formed into a T-shaped flexure. The first modification is used when the flexure 105 and the slider 101 can be satisfactorily bonded to each other even if the bonding area is small. Since a large portion of the rear surface of the slider 101 is seen from under the flexure 105, this structure can be effectively applied to a case in which a slider flying motion or the like is to be measured by using a laser interferometer.

Second Modification

Figure 7B:
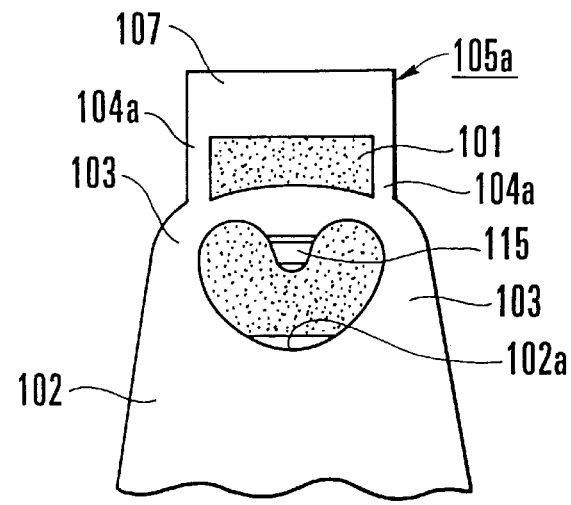

In the second modification shown in FIG. 7B, one connect arm 104 in the first embodiment is separated laterally into two connect arms 104a along the center line of the load beam 102. These connect arms and the slider mount stage 107 constitute a U-shaped flexure 105a. In this case, although the slider support stiffness (especially the roll stiffness) increases, since the seek stiffness greatly increases, a magnetic had slider support mechanism having good vibration characteristics, in which a large resonance gain does not appear up to a high-frequency band, can be obtained.

Third Modification

Figure 7C:
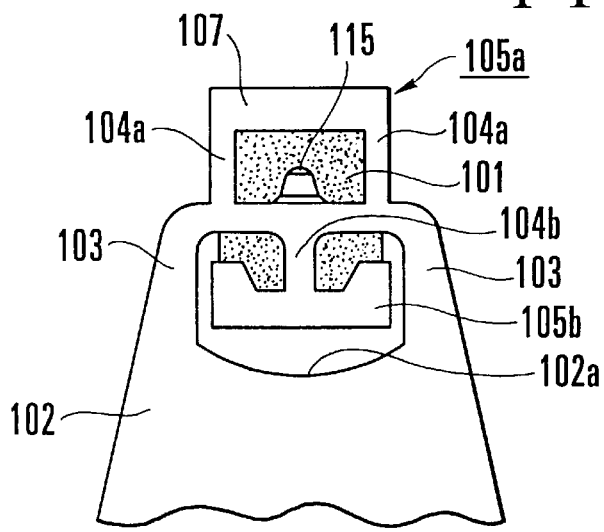
Figures 9A, 9B:
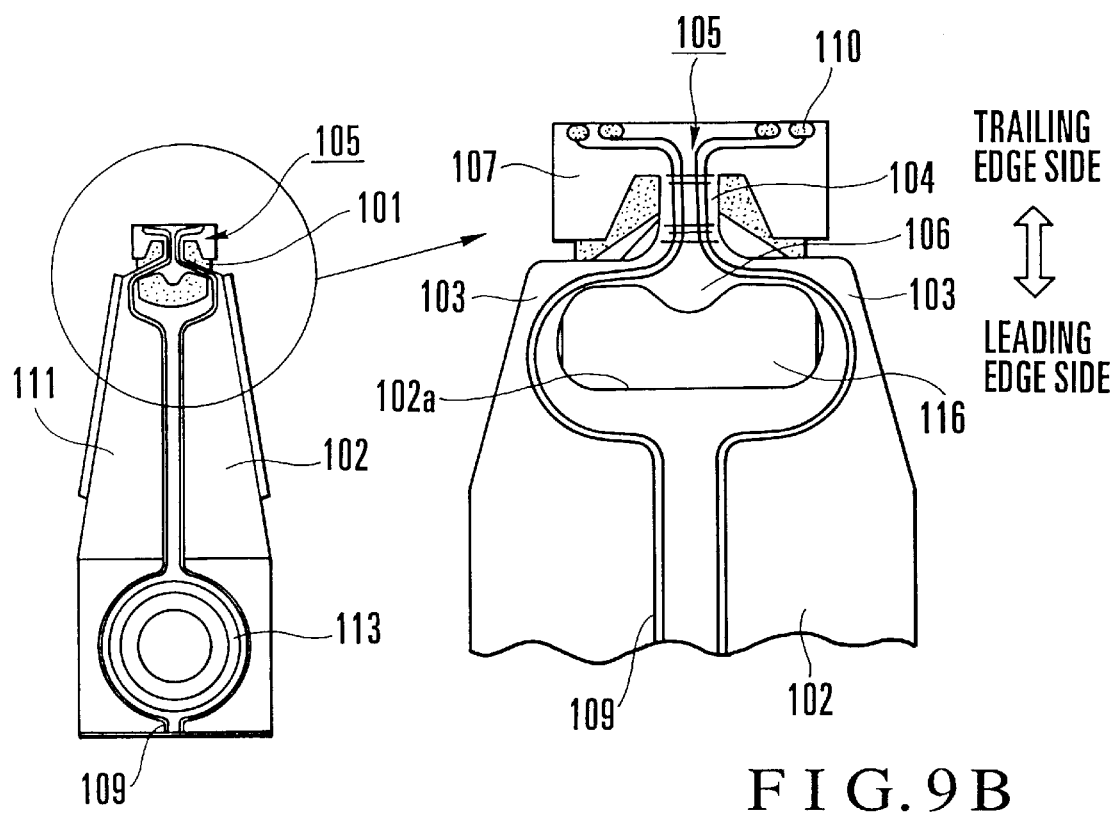
FIGS. 9A to 9D are a plan view, an enlarged view of the main part, a front view, and a side view, respectively, of a slider support mechanism according to the second embodiment of the present invention.
Figure 9C:
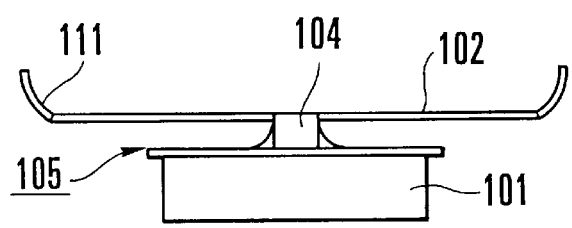
Figure 9D:
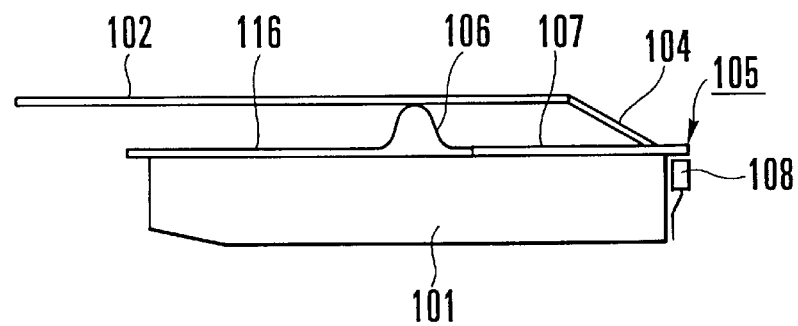

The third modification shown in FIG. 7C has an E-shaped flexure 105b having a connector arm 104b like the one shown in FIGS. 4A to 4D on the leading edge side of the slider 101 in the opening portion 102a, in addition to the U-shaped flexure 105a formed on the trailing edge side in the second modification. In addition, the tongue member 115 extends from the coupling portion of one pair of base arms 103 to the flexure 105a side. This structure is used when a large slider bonding area and a sufficiently high seek stiffness are to be obtained. In this case, the three connect arms 104a and 104b on the front and rear sides must be sufficiently thinned to cope with a reduction in roll/pitch stiffness.

Fourth Modification

FIG. 8A shows a structure in which the E-shaped flexure 105 shown in FIGS. 4A to 4D is set only within an area from the distal end of the load beam 102 to the leading edge of the slider 101, i.e., only within the opening portion 102a. Referring to FIG. 8A, the tongue member 115 extends from the distal end of the load beam 102 to the trailing edge side of the slider 101. This structure is used for a contact slider in which the slider 101 is always in contact with the magnetic disk surface, or a slider requiring a reverse pitch bias. In this case, the signal lines 109 must be drawn from the trailing edge of the slider 101 to the flexure 105 on the leading edge side of the slider 101 through the rear surface of the slider 101.

Fifth Modification

FIGS. 8B to 8D show a structure in which the tongue member 115 in the fourth modification extends to the trailing edge of the slider 101. This structure is used for a contact type three-pad slider (contact slider) instead of a flying type slider. If the tongue member 115 is set at the center of the trailing edge of the slider 101, a pitch motion of the slider 101 at its gap position as a rotational axis can be realized. Stable contact of the contact pad 119 at the gap position can be guaranteed. At the same time, the flexure 105 provides a flexible support stiffness for the two pad portions on the leading edge side of the slider 101, and hence a stable sliding motion can be obtained while head jumps are suppressed.

In the contact type magnetic disk storage, as shown in FIG. 8D, information is recorded/reproduced while the slider 101 is in contact or close to the magnetic disk 601.

Second Embodiment

Figure 10A:
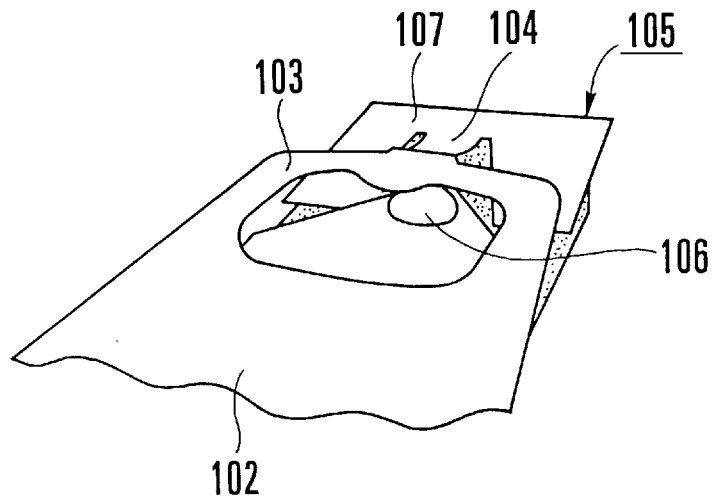
FIGS. 10A to 10C are perspective views of the main part of the slider support mechanism according to the second embodiment of the present invention.
Figure 10B:
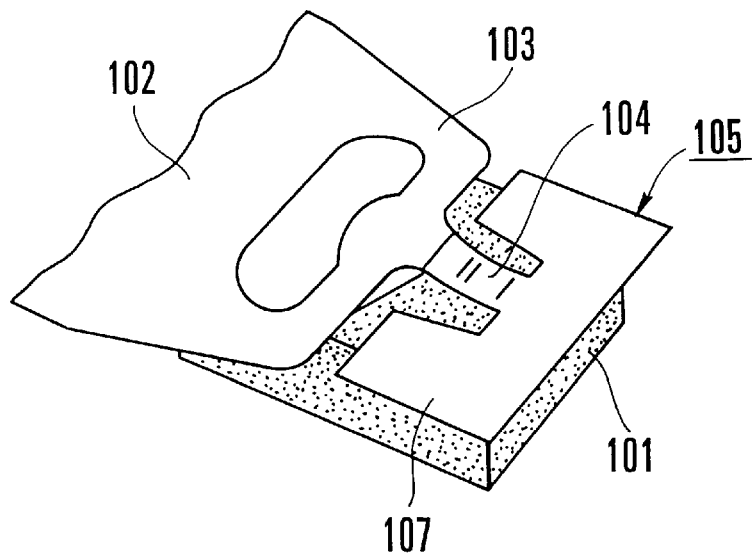
Figure 10C:
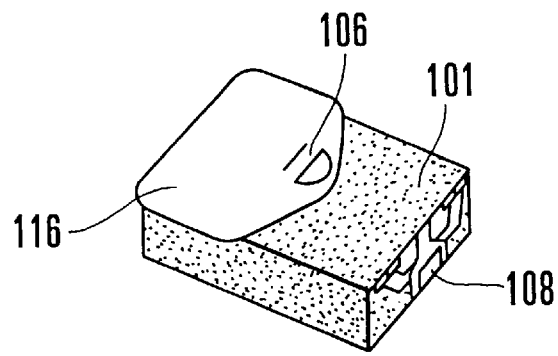

FIGS. 9A to 9D show the main part of a slider support mechanism according to the second embodiment of the present invention. FIGS. 10A and 10B show the slider support mechanism. FIG. 10C shows a slider to which a substage is bonded. The second embodiment differs from the first embodiment in that a pivot 106 is formed on a slider 101 side instead of the tongue member having the U-shaped cross-section. More specifically, the pivot 106 is formed on the rear surface of a substage 116 bonded to a slider mount stage 107 on which the slider 101 is mounted.

In the second embodiment, the structure of a flexure 105 constituted by an opening portion 102a, a base arm 103, a connect arm 104, and the slider mount stage 107, and mounted on the distal end of a load beam 102 is the same as that in the first embodiment, as shown in FIG. 10B, and hence a description thereof will be omitted.

As shown in FIG. 10C, the substage 116 having the pivot 106 protruding to the flexure side is bonded to the flexure connection side surface of the slider 101. In this case, the pivot 106 is preferably set to the central position of the slider 101 or the designed pressing position. In addition, the substage 116 is preferably bonded avoiding the slider mount stage 107 of the flexure 105. If, however, the HGA (Head Gimbal Assembly) height allows, the substage 116 may be bonded to the entire rear surface of the slider 101, and the slider mount stage 107 may be bonded to the substage 116 so as to be stacked thereon.

The diameter of the pivot 106 is generally 0.45 mm to 0.16 mm and is determined by the dimensions of the slider, the HGA height, the process precision, and the like. The slider 101 to which the substage 116 having the pivot 106 is bonded/fixed is mounted on the slider mount stage 107. In this case, as shown in FIG. 10A, the slider 101 is preferably positioned such that the pivot 106 comes into point-contact with the central portion of the bridge of the base arms 103, i.e., the coupling portion of the base arms 103. With this structure, a pressure load from the load beam 102 is applied as an ideal point load to the slider 101 through the pivot 106, and the flying motion of the slider 101 can be flexibly supported on the pivot.

When the pivot 106 of the substage 116 comes into contact with the coupling portion of the base arms 103, a level difference corresponding to the height of the pivot 106 is caused between the base arms 103 and the slider mount stage 107. As in the first embodiment, therefore, this level difference must be absorbed by providing a pressed portion for the connect arm 104 or deflecting it.

With the use of the magnetic head support mechanism having this structure, the flexure 105 and the load beam 102 can be integrally formed. This structure can therefore be easily applied to a wire-integrated type suspension in which the signal lines of the magnetic head are formed by forming a thin film on the surface of the load beam 102. In addition, since the magnetic head slider support mechanism having the slider/pivot support structure can be realized, a flexible slider support stiffness and a proper load (pressing by a point load) on the slider 101 can be attained.

Figure 11A:
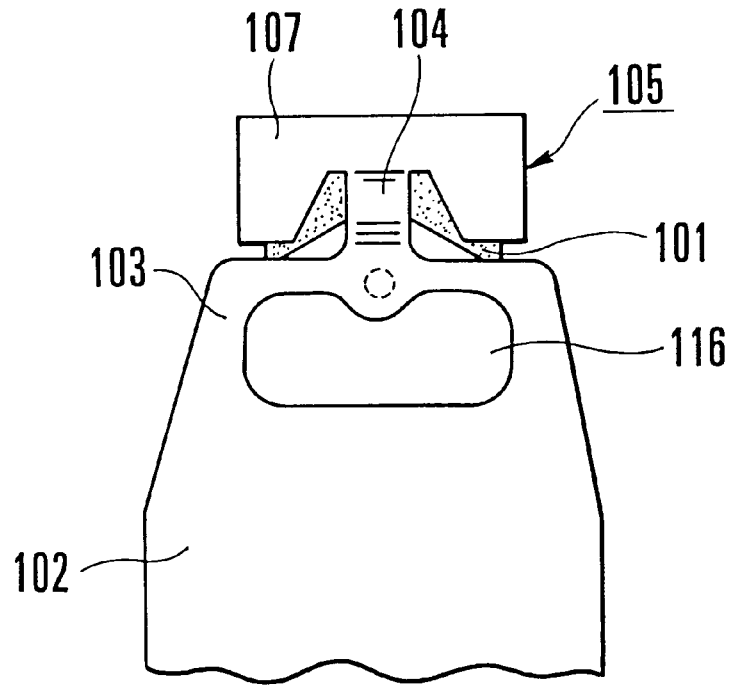
FIGS. 11A and 11B are views showing the main part of the slider support mechanism according to the second embodiment of the present invention.
Figure 11B:
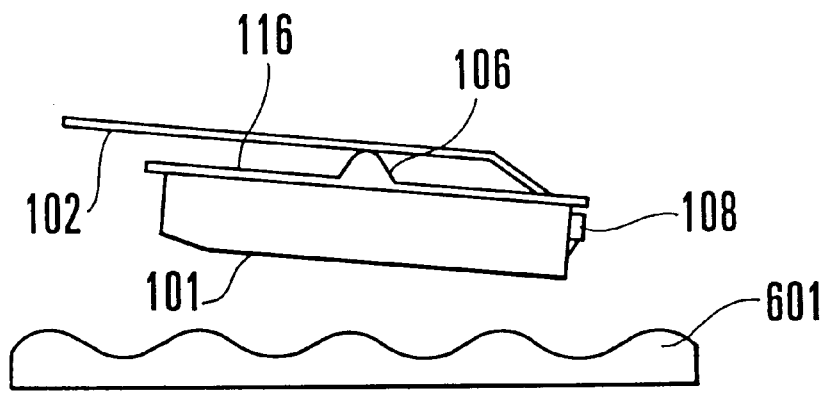

FIGS. 11A and 11B schematically show only the main part of the second embodiment.

Figure 12A:
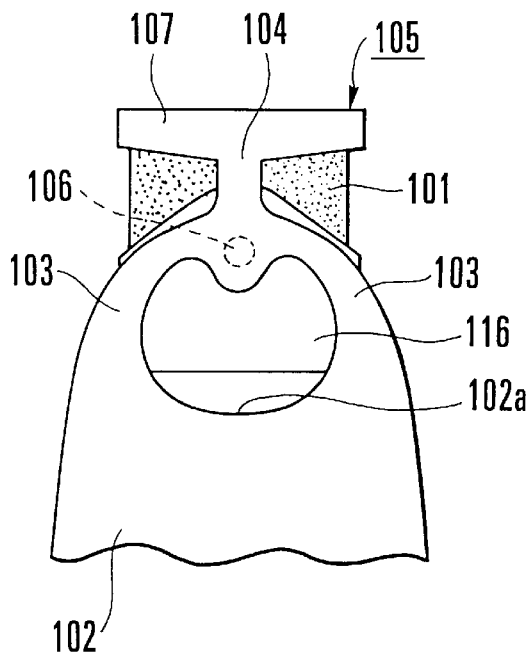
FIGS. 12A to 12D are views showing modifications of the slider support mechanism according to the second embodiment of the present invention.
Figure 12B:
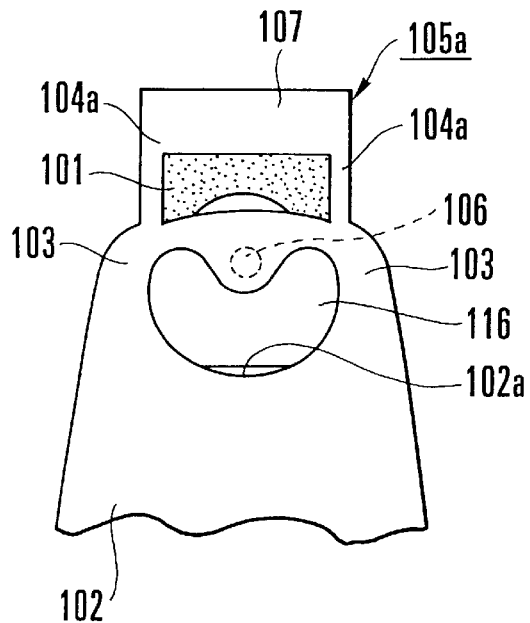

FIGS. 12A to 12D and 13A to 13C show modifications of the second embodiment. The modifications shown in FIGS. 12A and 12B are similar to those of the first embodiment.

First Modification

The opening portion 102a formed in the distal end portion of the load beam 102 may have an arcuated shape like the one shown in FIG. 12A. In the first modification shown in FIG. 12A, the E-shaped flexure 105 in the first embodiment is simplified into a T-shaped flexure. This structure is used when the flexure and the slider can be satisfactorily bonded to each other even with a small slider bonding area, and the substage 116 needs to have a large area because of limitations imposed on a pivot forming process.

Second Modification

In the second modification shown in FIG. 12B, one connect arm 104 in the second embodiment is separated laterally into connect arms 104a to form a U-shaped flexure 105a along the center line of the load beam 102, thereby improving the seek stiffness.

Third Modification

Figure 12C:
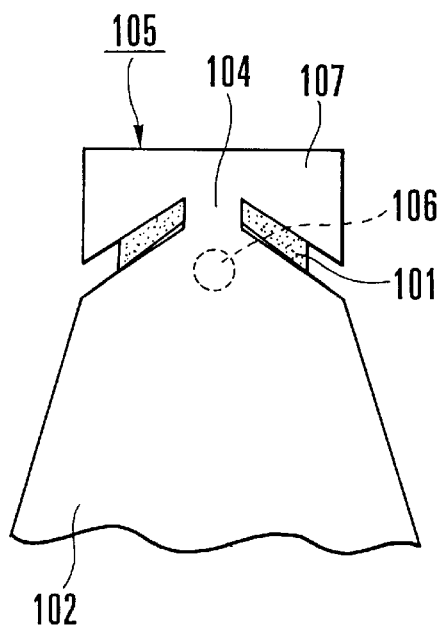

In the third modification shown in FIG. 12C, the opening portion 102a in the second embodiment is omitted to obtain a simpler structure. With this structure, the support spring stiffness improves although some difficult is posed in positioning in a slider bonding process.

Fourth Modification

Figure 12D:
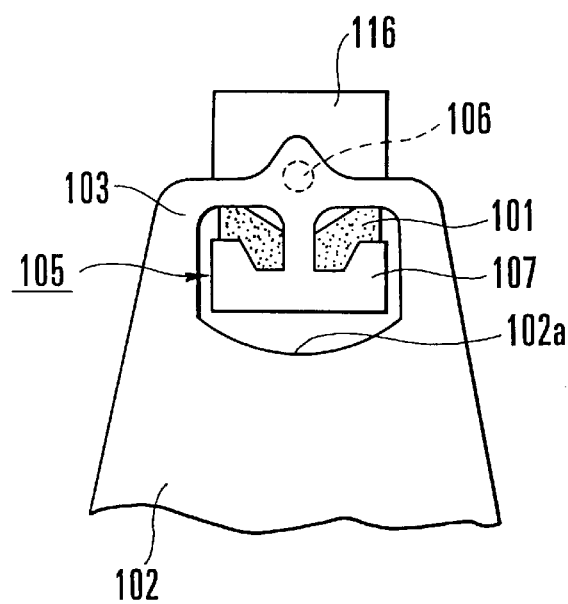

In the fourth modification shown in FIG. 12D, the E-shaped flexure 105 in the second embodiment is formed on the leading edge side to oppose the opening portion 102a, and the substage 116 is formed on the trailing edge side of the slider 101. This structure is used when a reverse pitch bias is required for the slider 101.

fifth Modification

In the fifth modification shown in FIGS. 13A to 13C, the pivot 106 of the substage 116 on the trailing edge side of the slider 101 is placed near the central portion of the trailing edge instead of the central position of the slider 101. This structure is especially used for a contact type three-pad slider (contact slider), and realizes a pitching/sliding motion of the slider 101 at its gap position as a rotational axis, thereby guaranteeing stable contact of the contact pad 119 at the gap position. At the same time, the flexure 105 provides a flexible support stiffness for the two pad potions on the leading edge side, and hence a stable sliding motion can be obtained while jumps of a magnetic head 108 supported on the trailing edge of the slider 101 are suppressed.

Third Embodiment

Figure 3:
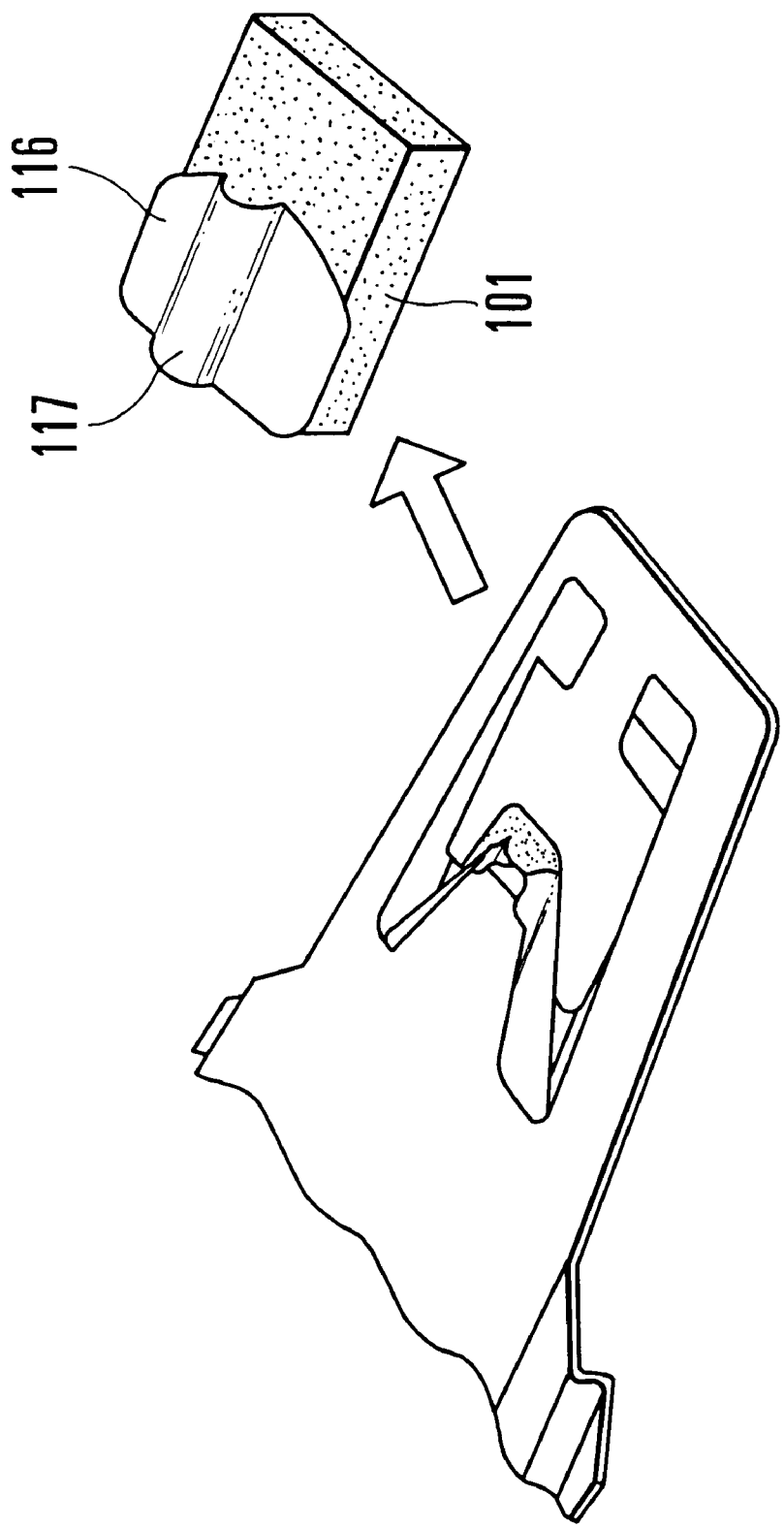
FIG. 3 is a perspective view for explaining a substage.

FIGS. 14A to 14D show the main part of a slider support mechanism according to the third embodiment of the present invention. FIGS. 15A and 15B show the slider support mechanism in FIGS. 14A to 14D. FIG. 15C shows a slider to which a substage is bonded. The third embodiment differs from the first embodiment in that a substage 116 having a roof 117 with an inverted U-shaped cross-section is bonded to a slider 101, as shown in FIG. 3.

Since the load beam portion is identical to that in the first embodiment shown in FIGS. 4A to 4D, a description thereof will be omitted.

On the rear surface of the slider 101, the roof 117 having an inverted U-shaped cross-section and protruding to the flexure 105 slide is mounted on the substage 116 along the center line of the slider 101. The substage 116 is bonded to a surface of the slider 101 which is to be fixed to the flexure 105. In this case, the roof 117 is preferably placed on the center line of the slider 101 or a line passing through the designed pressing position and extending in the longitudinal direction of the slider 101. In addition, the substage 116 is preferably bonded avoiding a slider mount stage 107.

If, however, the HGA height allows, the substage 116 may be bonded to the entire surface of the slider 101, and the slider mount stage 107 may be bonded to the substage 116 so as to be stacked thereon. The slider 101 on which the substage 116 having the roof 117 is bonded/fixed is bonded/fixed to the slider mount stage 107. With this process, a tongue member 115 formed on a base arm 103 crosses each convex portion of the roof 117 formed on the substage 116 to point-support the slider 101. In this case, the tongue member 115 may be made wide to a certain extent, unlike the tongue member resembling a pivot in the first embodiment. If the roof 117 is made wide to a certain extent, a stable intersection can be obtained.

In addition, the slide 101 is preferably fixed after positioning is performed such that the intersection between the tongue member 115 and the roof 117 comes to the designed slider pressing position. With this structure, a pressure load from the load beam 102 is applied as an ideal point load to the slider 101 through the intersection between the tongue member 115 and the roof 117. In addition, the motions of the slider 101 in the rolling and pitching directions can be flexibly supported by rotating motions on the tongue member 115 and the roof 117 serving as fulcrums.

Figures 14A, 14B:
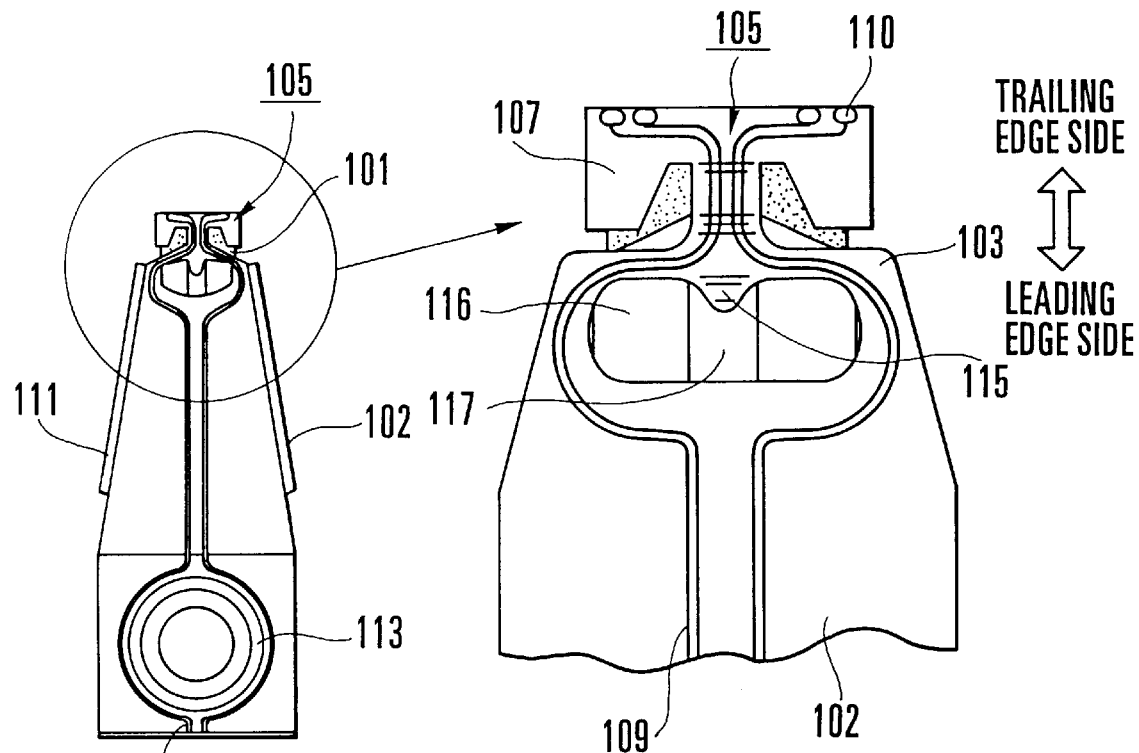
FIGS. 14A to 14D are a plan view, an enlarged view of the main part, a front view, and a side view, respectively, of a slider support mechanism according to the third embodiment of the present invention.
Figure 14C:
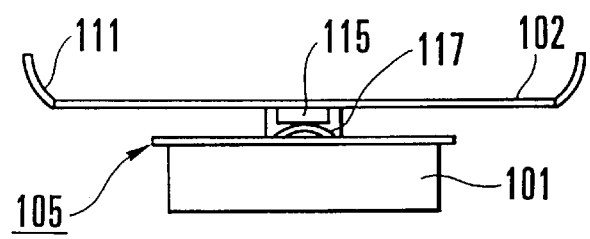
Figure 14D:
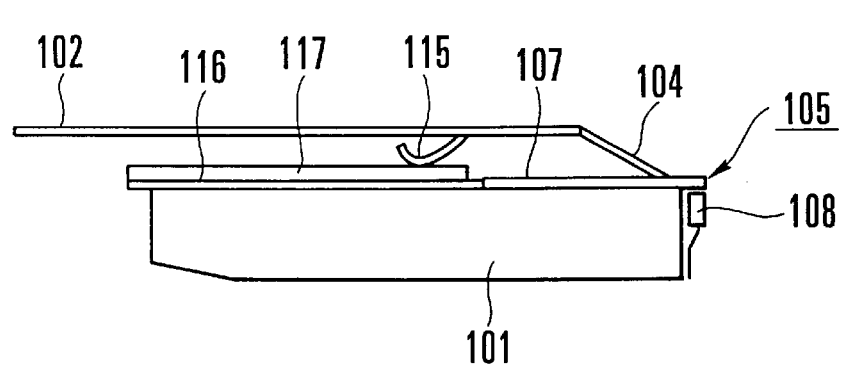
Figure 15A:
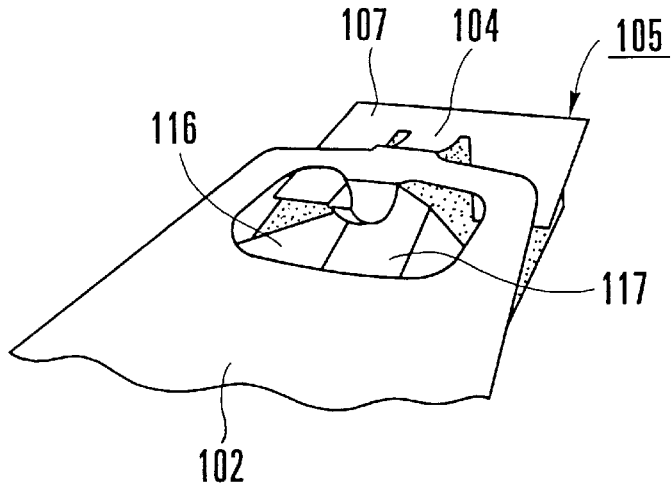
FIGS. 15A to 15C are perspective views of the main part of the slider support mechanism according to the third embodiment of the present invention.
Figure 15B:
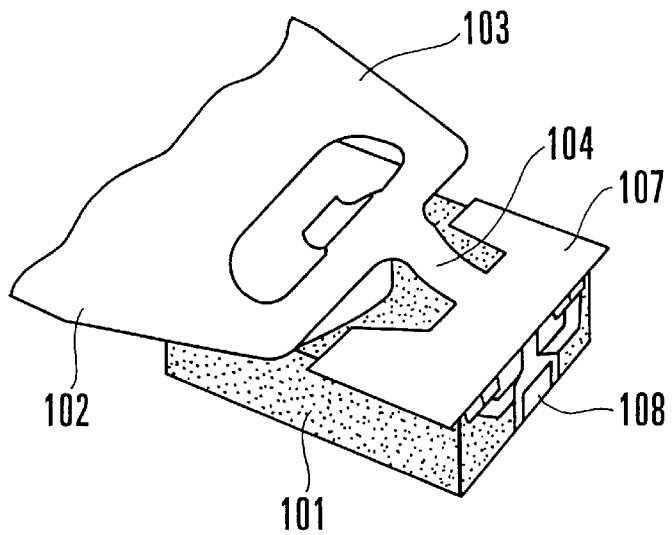
Figure 15C:
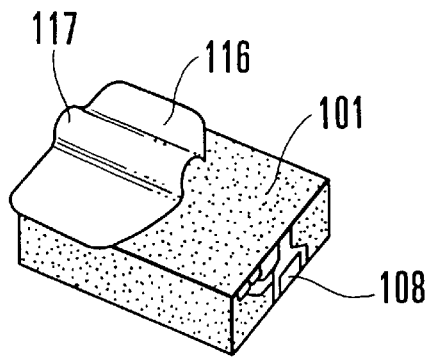

Owing to the intersection between the tongue member 115 and the roof 117, a level difference corresponding to the height of the flange and the height of the roof is caused between the base arm 103 and the flexure 105, as shown in FIGS. 14C, 14D, and 15A. To absorb this level difference, a connect arm 104 must have a pressed portion or must be deflected by using the elastic force of the connect arm 104. In consideration of damage to wiring patterns, it is better to avoid pressing.

With the use of the magnetic head support mechanism having this structure, the flexure 105 and a load beam 102 can be integrally formed. This structure can therefore be easily applied to a wire-integrated type suspension in which the signal lines of a magnetic head 108 are formed by forming a thin film on the surface of the load beam 102. In addition, since a suspension having a slider point support structure can be easily realized, a flexible slider support stiffness and a proper load (pressing by a point load) on the slider 101 can be attained.

Figure 16A:
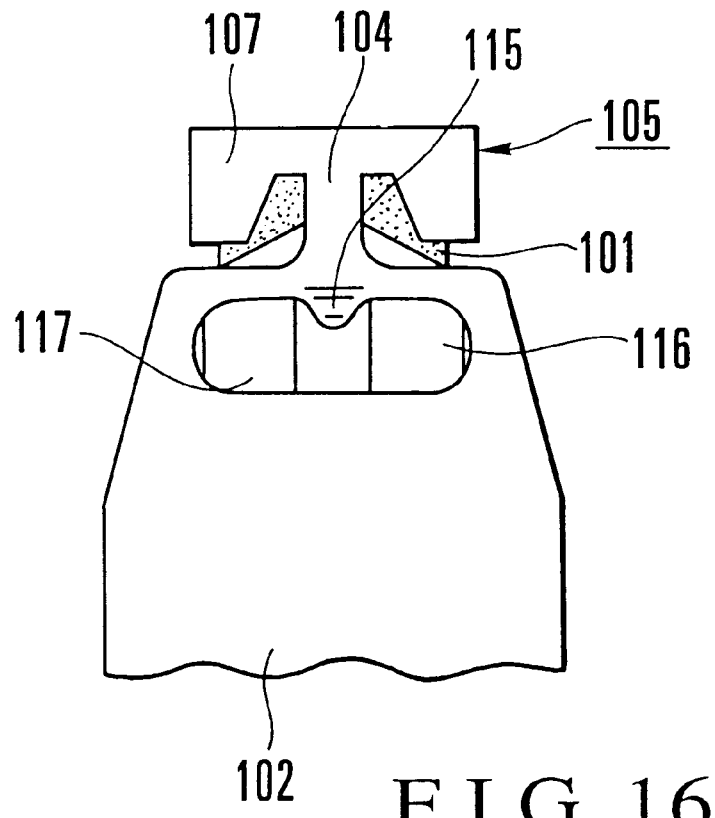
FIGS. 16A and 16B are views schematically showing the slider support mechanism according to the third embodiment of the present invention.
Figure 16B:
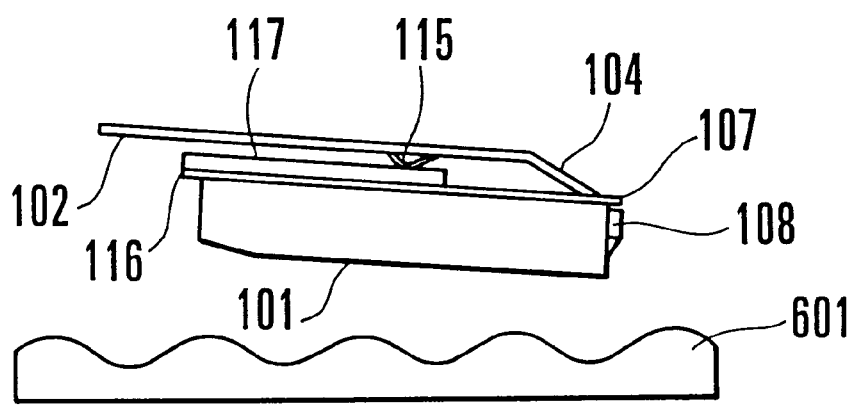

FIGS. 16A and 16B schematically show the main part of the third embodiment.

Figure 17A:
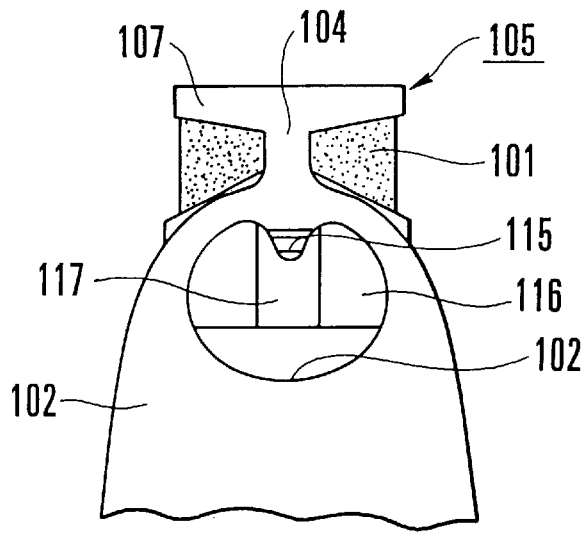
FIGS. 17A to 17C are views showing modifications of the slider support mechanism according to the third embodiment of the present invention.
Figure 17B:
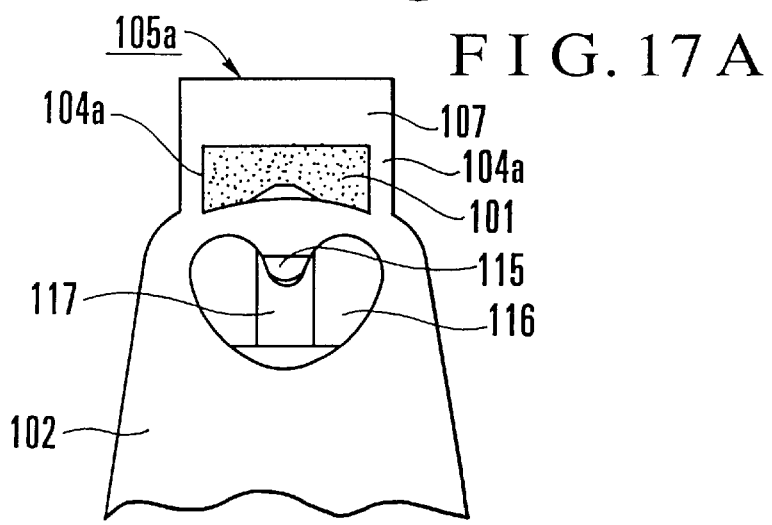

FIGS. 17A to 17C and 18A to 18E show modifications of the third embodiment. The modifications in FIGS. 17A and 17B are similar to those of the first embodiment.

First Modification

An opening portion 102a formed in the distal end portion of the load beam 102 may have an arcuated shape like the one shown in FIG. 17A. According to the first modification shown in FIG. 17A, the E-shaped flexure 105 in the third embodiment is formed into a T-shaped flexure. This structure is used when the flexure can be satisfactorily bonded even if the bonding area of the slider mount stage 107 is small.

Second Modification

In the second modification shown in FIG. 17B, one connect arm 104 in the third embodiment is separated laterally into two connect arms 104a along the center line of the load beam to form a U-shaped flexure 105a so as to improve the seek stiffness. In this case, although the roll stiffness slightly increases, a magnetic head slider support mechanism having good vibration characteristics, in which a large resonance gain does not appear up to a high-frequency band, can be obtained.

Third Modification

Figure 17C:
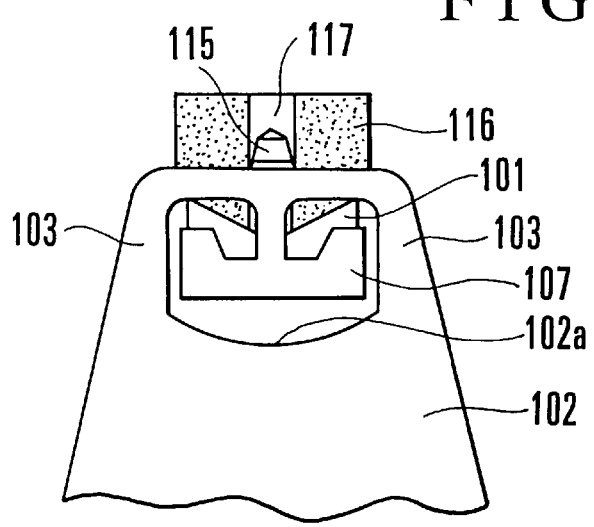

In the third modification shown in FIG. 17C, the E-shaped flexure 105 extends from the coupling portion of the base arm 103 to the leading edge side so as to oppose the opening portion 102a, and the tongue member 115 extends from the coupling portion of the base arms 103 to the trailing edge side. In addition, the substage 116 is bonded to the trailing edge side of the slider 101. This structure is used when a reverse pitch bias is required for the slider 101.

Fourth Modification

Figure 18A:
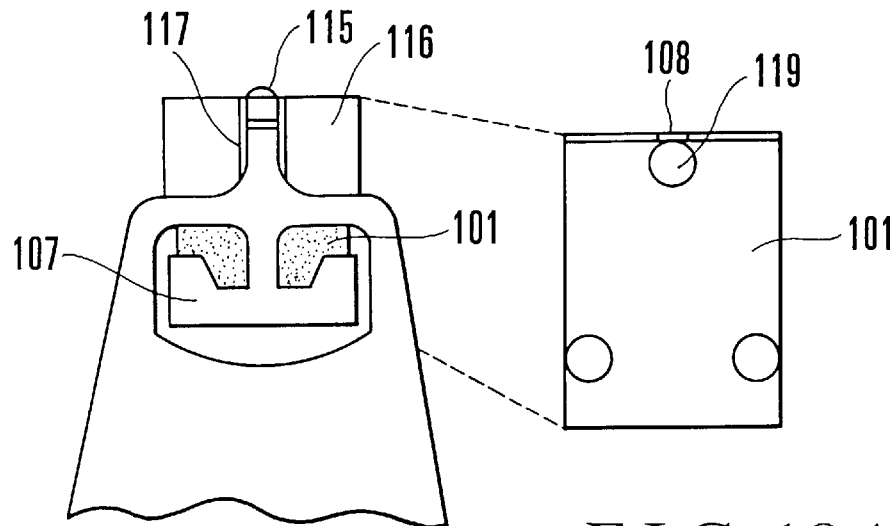
FIGS. 18A to 18E are views showing modifications of the slider support mechanism according to the third embodiment of the present invention.
Figure 18B:
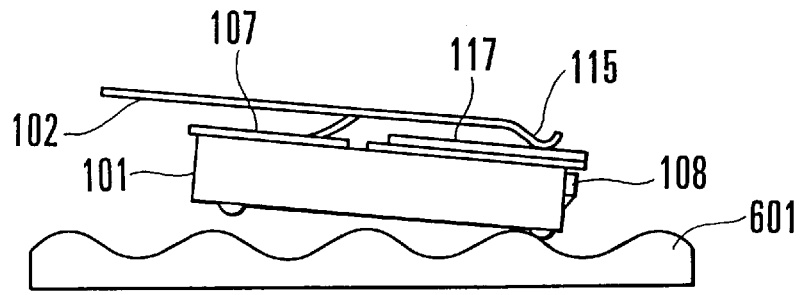
Figure 18C:
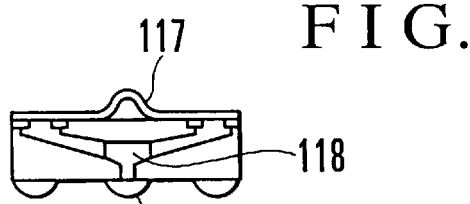
Figure 18D:
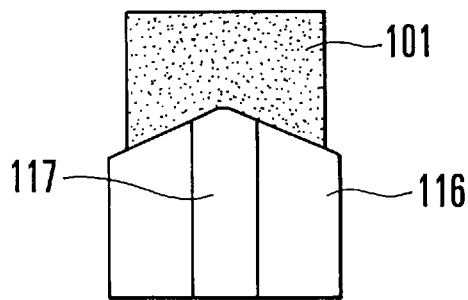
Figure 18E:
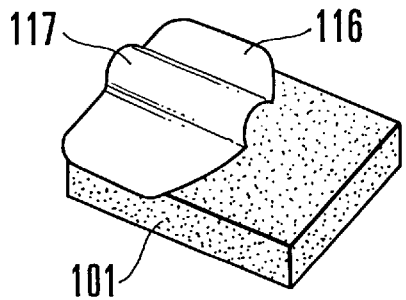

In the fourth modification shown in FIGS. 18A to 18E, the tongue member 115 formed on the trailing edge side in the third modification in FIG. 17C extends to a position near the central portion of the trailing edge of the slider 101 instead of the central position of the slider 101. With this structure, the intersection between the roof 117 mounted on the substage 116 and the tongue member 115 is located near the central portion of the trailing edge. This structure is used especially for a contact type three-pad slider (contact slider), and allows a pitching/sliding motion at the gap position of the slider 101 as a rotational axis. As shown in FIG. 18B, stable contact between a contact pad 119 at the gap position and the magnetic disk surface is guaranteed. At the same time, the flexure 105 provides a flexible support stiffness for the two pad portions on the leading edge side, and hence a stable sliding motion can be obtained while jumps of a magnetic head 108 are suppressed.

Fourth Embodiment

FIGS. 19A to 19C and 20 show a slider support mechanism according to the fourth embodiment of the present invention. According to the fourth embodiment, a load beam 102 and a flexure 105 are made of a thin strip plate which as a stainless steel plate. As shown in FIG. 19A, a W-shaped (or H-shaped) opening portion (cutting) is formed in the distal end portion of the load beam 102. As a result, a convex stage 118 protruding to the trailing edge side of a slider 101 is formed on the distal end portion of the load beam 102. A U-shaped tongue member 115 protruding to the slider 101 side is formed on the convex stage 118 at a position on the center line of the load beam 102. In this case, the position of the tongue member 115 is set to the central position of the magnetic head slider or the designed pressing position. The dimensions of the tongue member 115 comply with the dimensional requirements in the first embodiment.

The flexure 105 is formed around the convex stage 118 in the form of a loop. As shown in FIGS. 19B and 20, one connect arm 104 extending toward the leading edge along the center line of the load beam 102 extends from the distal end portion of the flexure 105 on the trailing edge side. A slider mount stage 107 is formed on the distal end portion of the connect arm 104 so as not to overlap the convex stage 118. In this case, the width and length of the connect arm 104 and the size of the slider mount stage 107 are preferably set in accordance with the references specified in the first embodiment.

Since the tongue member 115 is in contact with the slider mount stage 107, a level difference corresponding to the height of the flange is caused between the convex stage 118 and the slider mount stage 107, as shown in FIG. 19C. This level difference must be absorbed by providing a pressed portion for the connect arm 104 or using deflection of the connect arm 104. With the use of the magnetic head support mechanism having this structure, the flexure and the load beam can be integrally formed. This structure can therefore be easily applied to a wire-integrated type suspension in which the signal lines 109 of a magnetic head 108 are formed by forming a thin film on the surface of the load beam. In addition, since a magnetic head slider support mechanism having a support form similar to a suspension having a slider/pivot support structure, which has been used for a conventional flexure/load beam separation type structure, can be realized, a flexible slider support stiffness and a proper load (pressing by a point load) can be obtained.

FIGS. 21A and 21B schematically show the main part of the fourth embodiment. FIGS. 22A to 22D and 23A to 23C show modifications of the fourth embodiment.

First Modification

FIG. 22A shows the first modification of the fourth embodiment, in which the W-shaped cutting (opening portion) formed in the distal end portion of the load beam 102 in the fourth embodiment is changed to an H-shaped cutting. This structure is used when bonding can be satisfactorily performed even if the bonding area of the slider mount stage 107 is small. Since the rear surface of the slider is wide open, this structure can be effectively used to measure vibrations or the like by using a laser interferometer or the like.

Second Modification

FIG. 22B shows the second modification, in which one connect arm 104 in the fourth embodiment is separated laterally into two connect arms 104a along the longitudinal axis of the load beam to connect the flexure 105 to the slider mount stage 107 through the two connect arms 104a. In this case, although the slider support stiffness increases, since the seek stiffness greatly increases, a magnetic head slider support mechanism having good vibration characteristics, in which a large resonance gain does not appear up to a high-frequency band, can be obtained.

Third Modification

FIG. 22C shows the third modification, in which the W-shaped cutting formed in the distal end portion of the load beam 102 in the fourth embodiment is rotated about the tongue member 115 through 90° with respect to the center line of the load beam 102. In this case, the rotational direction of the cutting is determined by the rotational direction of a magnetic disk. This structure is mainly used for a magnetic head slider support mechanism of a dog-leg scheme in which the center line of the slider 101 in the longitudinal direction intersects with the center line of the slider 101 at a right angle.

Fourth Modification

FIG. 22D shows the fourth modification, in which the T-shaped slider mount stage 107 is set on the leading edge side of the slider 101 instead of the trailing edge side, while the convex stage 118 is set on the trailing edge side of the slider 101, and the tongue member 115 is placed in the reverse direction. This structure is used for a contact slider in which the slider is always in contact with the recording medium surface, or a slider requiring a reverse pitch bias.

Fifth Modification

FIGS. 23A to 23C show the fifth modification, in which the convex stage 118 in the fourth embodiment is reduced in size, and the tongue member 115 is moved to the trailing edge of the slider 101. This structure is especially used for a contact type three-pad slider (contact slider) instead of a flying type slider. As shown in FIG. 23A, since the tongue member 115 is set at the center of the trailing edge of the slider 101, the pitching motion of the slider 101 at the gap position as a rotational axis can be realized. As shown in FIGS. 23B and 23C, stable contact of a contact pad 119 at the gap position can be guaranteed. At the same time, the flexure 105 provides a flexible support stiffness for the two pads on the leading edge side, and hence a stable sliding motion can be obtained while jumps of the magnetic head 108 are suppressed.

Fifth Embodiment

FIGS. 24A to 24C and 25A show a slider support mechanism according to the fifth embodiment of the present invention. FIGS. 25B to 25D show a slider used in the fifth embodiment. The fifth embodiment differs from the fourth embodiment in that a pivot 106 is formed on the slider 101 side instead of the tongue member 115. A description of the same portions in these embodiments will be omitted.

Figure 25A:
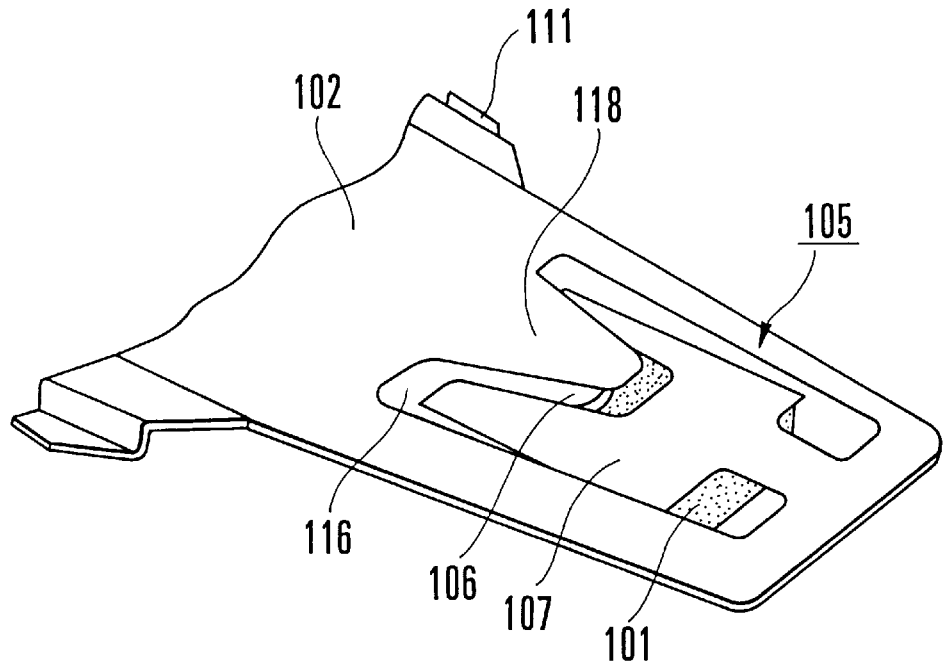
FIGS. 25A to 25D are a perspective view of the slider support mechanism according to the fifth embodiment of the present invention, and a plan view, a front view, and a perspective view of a slider, respectively.
Figures 25B, 25C:
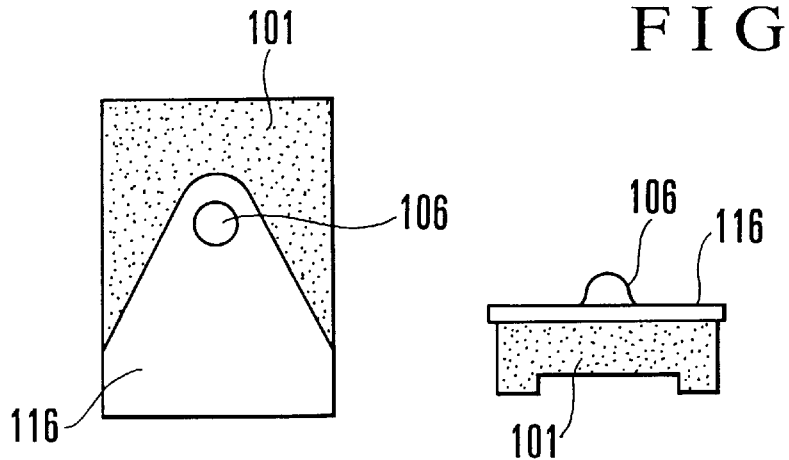
Figure 25D:
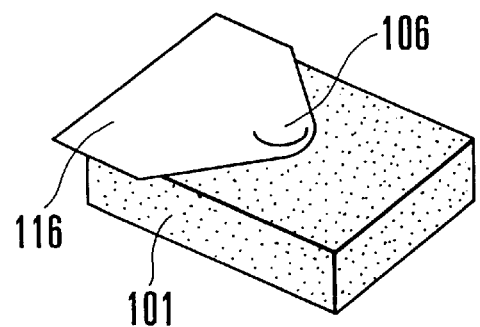

As shown in FIGS. 24A, 24B, and 25A, a substage 116 having the pivot 106 protruding to the flexure 105 side is bonded to the rear surface of the slider 101. In this case, the pivot 106 is preferably set to the central position of the slider 101 or the designed pressing position. The substage 116 is preferably bonded avoiding a slider mount stage 107. If, however, the HGA height allows, the substage 116 may be bonded to the entire rear surface of the slider, and the slider mount stage 107 may be bonded on the substage 116 so as to be stacked thereon. In addition, the diameter of the pivot 106 preferably complies with the requirement in the second embodiment.

As shown in FIGS. 25B to 25D, the slider 101 to which the substage 116 having the pivot 106 is bonded is bonded/fixed to the slider mount stage 107. In this case, the slider 101 is positioned such that the pivot 106 comes into contact with a convex stage 118. With this structure, a pressure load from a load beam 102 can be applied as an ideal point load to the slider 101 through the pivot 106, and the flying motion of the slider 101 can be flexibly supported on the pivot.

When the slider 101 is mounted on the magnetic head slider support mechanism, a level difference like the one shown in FIG. 24C is caused between the slider mount stage 107 and the convex stage 118 owing to the effect of the pivot 106. This level difference must therefore be absorbed by providing a pressed portion for a connect arm 104 or deflecting the connect arm 104.

With the use of the magnetic head support mechanism having this structure, the flexure and the load beam can be integrally formed. This structure can therefore be easily applied to a wire-integrated type suspension in which the signal lines of the magnetic head are formed by forming a thin film on the surface of the load beam. In addition, since a magnetic head slider support mechanism having a slider/pivot support structure can be realized, a flexible slider support stiffness and a proper load (pressing by a point load) on the slider can be attained.

FIG. 26A and 26B schematically show the main part of the fifth embodiment. FIGS. 27A to 27D and 28A to 28C show modifications of the fifth embodiment. These modifications are similar those of the fourth embodiment.

First Modification

FIG. 27A shows the first modification, in which the slider mount stage 107 has a T-shape. This structure is used when the slider 101 can be satisfactorily bonded even if the bonding area of the slider mount stage 107 is small.

Second Modification

FIG. 27B shows the second modification, in which one connect arm in the fifth embodiment is separated laterally into two connect arms 104a along the center line of the load beam 102 to connect the flexure 105 to the slider mount stage 107 through the two connect arms 104a. With this structure, since the seek stiffness greatly increases, a magnetic head slider support mechanism having good vibration characteristics can be obtained.

This Modification

FIG. 27C shows the third modification, in which the W-shaped cutting formed in the distal end portion of the load beam 102 on the fifth embodiment is rotated about the tongue member 115 through 90° with respect to the center line of the load beam 102. This structure is mainly used for a magnetic head slider support mechanism of the dog-leg scheme.

Fourth Modification

FIG. 27D shows the fourth modification, in which the T-shaped slider mount stage 107 in the first modification of the fifth embodiment is mounted on the leading edge side of the slider 101 instead of the trailing edge side. In addition, the convex stage 118 is mounted on the trailing edge side, and the substage 116 is bonded to the trailing edge side of the slider 101. This structure is used for a contact slider in which the slider 101 is always in contact with the magnetic disk surface, or a slider requiring a reverse pitch bias.

Fifth Modification

Figure 28A:
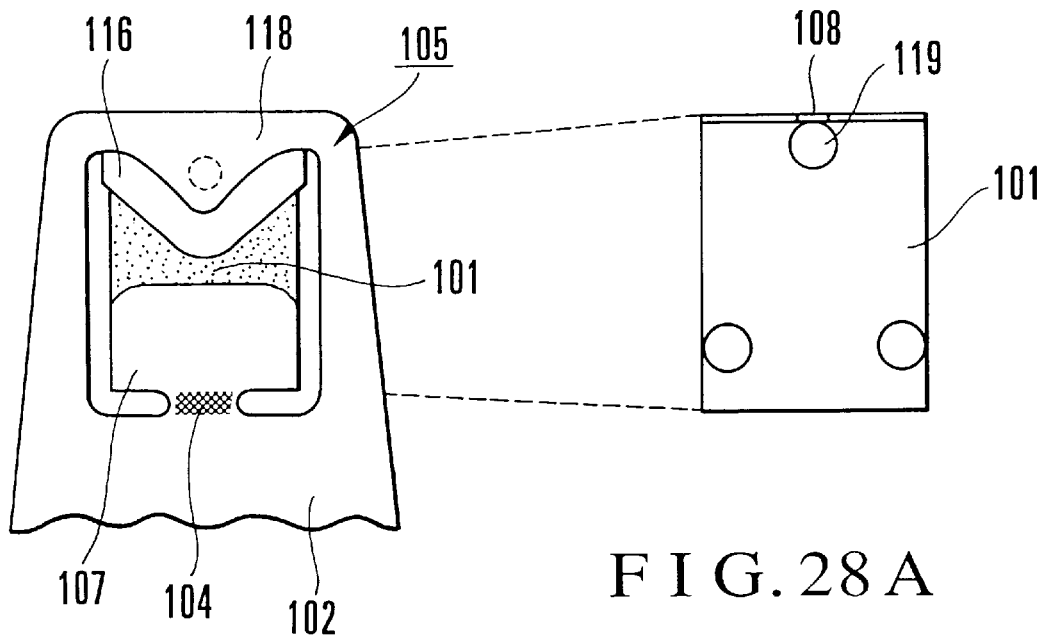
FIGS. 28A to 28C are views showing modifications of the slider support mechanism according to the fifth embodiment of the present invention.
Figure 28B:
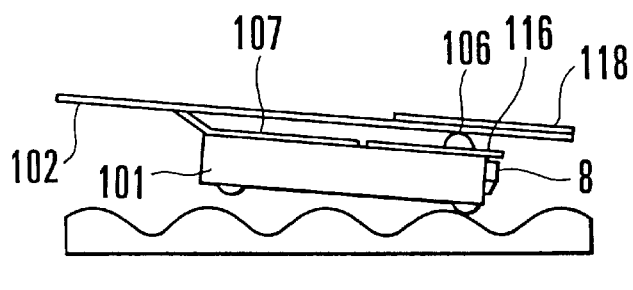
Figure 28C:
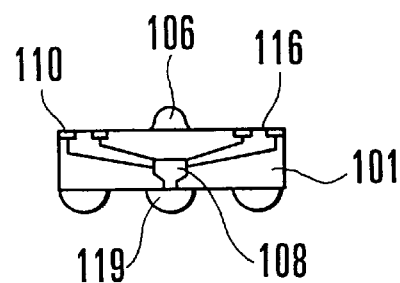

FIGS. 28A to 28C show the fifth modification, in which the convex stage 118 in the fourth modification of the fifth embodiment is reduced in size, and the pivot 106 of the substage 116 is moved to the central position of the trailing edge of the slider 101. This structure is especially used for a contact type three-pad slider (contact slider) instead of a flying type slider. The pitching motion of the slider at the gap position as a rotational axis can be realized, and stable contact of a contact pad 119 at the gap position can be guaranteed. At the same time, this structure aims at obtaining a stable sliding motion by suppressing jumps of the magnetic head because a flexible support stiffness can be obtained at the two pads on the leading edge side with the flexure 105.

Sixth Embodiment

FIGS. 29A to 29D and 30A show a slider support mechanism according to the sixth embodiment of the present invention. FIGS. 30B and 30C show a slider used in the sixth embodiment. Since a load beam 102 and a flexure 105 are the same as those in the fourth embodiment, a description thereof will be omitted. Since a slider 101 is the same as that in the third embodiment, only a brief description thereof will be made.

Referring to FIGS. 29A to 30C, a roof 117 having an inverted U-shaped cross-section and protruding to the flexure 105 side is fixed to the rear surface of the slider 101 along the center line of the slider 101 in the longitudinal direction. The substage 116 is bonded to a surface of the slider 101 to which a flexure is connected. The slider 101 to which the substage 116 having the roof 117 is bonded is bonded/fixed to the slider mount stage 107. A tongue member 115 having a U-shaped cross-section and the roof 117 having the inverted U-shaped cross-section and fixed to the substage 116 cross each other at the designed slider pressing position to point-support the slider 101. With this structure, a pressure load from the load beam 102 is applied as an ideal point load to the slider 101 through the intersection between the tongue member 115 and the roof 117. The motions of the slider 101 in the rolling and pitching directions can be flexibly supported by rotating motions about the tongue member 115 and the roof 117 as fulcrums.

Figure 31A:
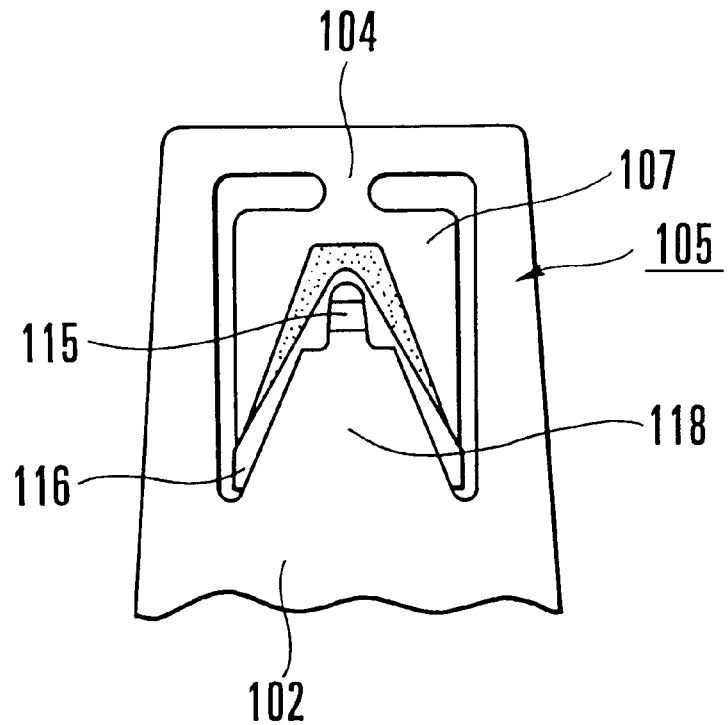
FIGS. 31A and 31B are views schematically showing the slider support mechanism according to the sixth embodiment of the present invention.
Figure 31B:
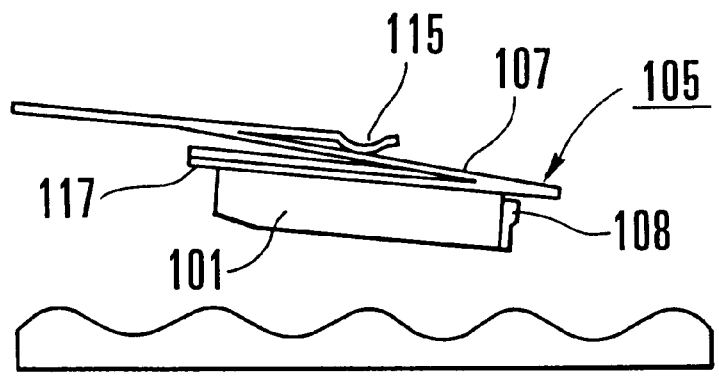
Figure 33A:
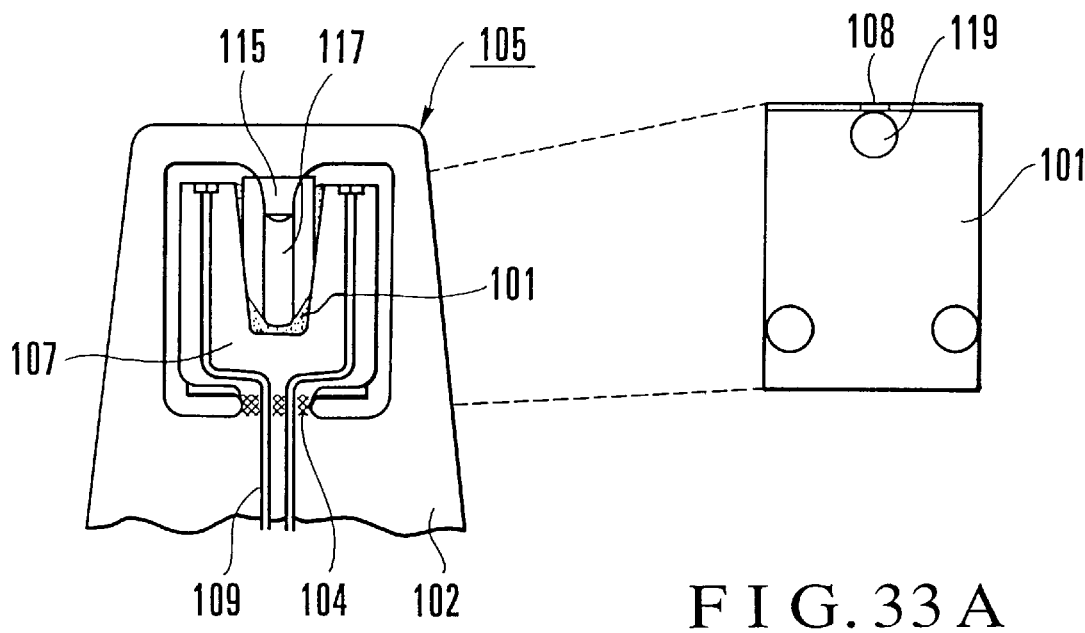
FIGS. 33A to 33E are views showing modifications of the slider support mechanism according to the sixth embodiment of the present invention.
Figure 33B:
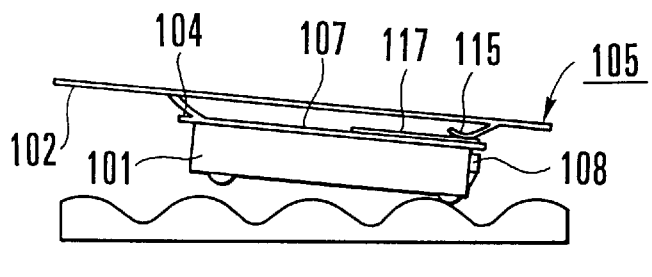
Figure 33C:
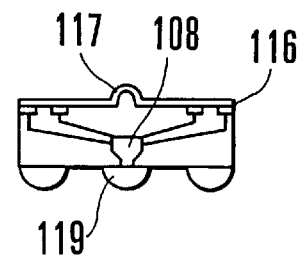
Figure 33D:
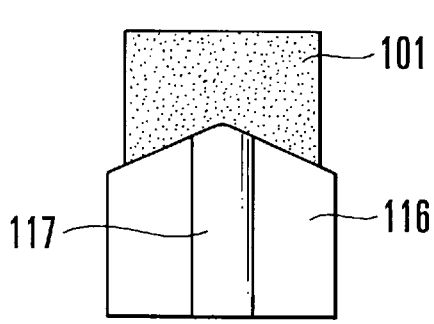
Figure 33E:
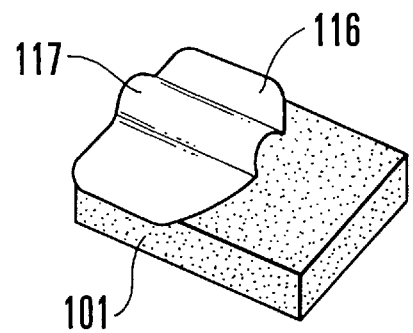

With the use of the magnetic head support mechanism having this structure, the flexure 105 and a load beam 102 can be integrally formed. This structure can therefore be easily applied to a wire-integrated type suspension in which signal lines 109 of a magnetic head 108 are formed by forming a thin film on the surface of the load beam 102. In addition, since a suspension having a slider point support structure can be easily realized, a flexible slider support stiffness and a proper load on the slider 101 can be attained. FIGS. 31A and 31B schematically show the sixth embodiment, and description thereof will be omitted.

FIGS. 32A to 32D show modifications of the sixth embodiment. These modifications are the same as those of the fourth embodiment except that the intersection between the tongue member 115 on the load beam 102 side and the roof 117 on the slider 101 side serves as a slider support portion instead of only the tongue member 115 on the load beam 102 side, and hence a description thereof will be omitted.

FIGS. 33A to 33E show a modification of the sixth embodiment. This modification is the same as the fifth modification of the fourth embodiment, and hence a description thereof will be omitted. This structure is especially used for a contact type three-pad slider (contact slider) to obtain a stable sliding motion of a contact pad 119 at the gap position.

Figure 1A:
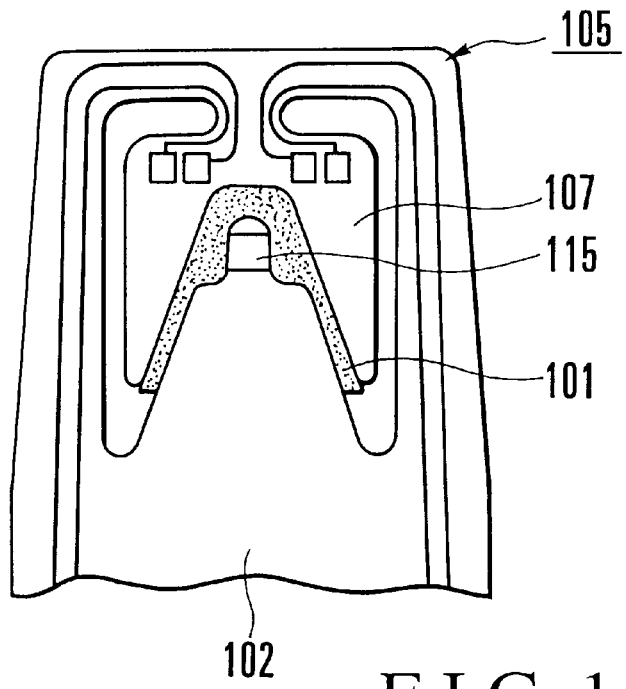
FIGS. 1A to 1C are views schematically showing a slider support mechanism according to the present invention.
Figure 1B:
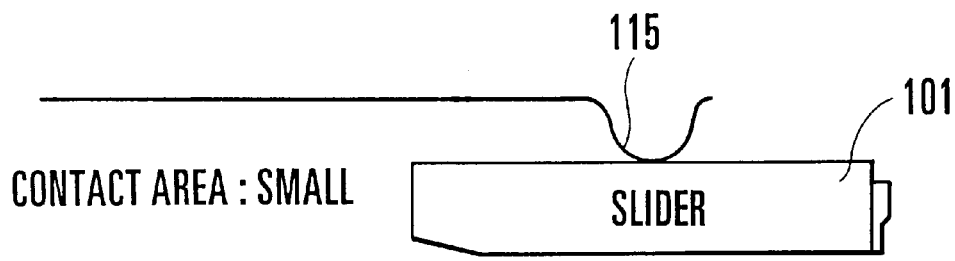
Figure 1C:
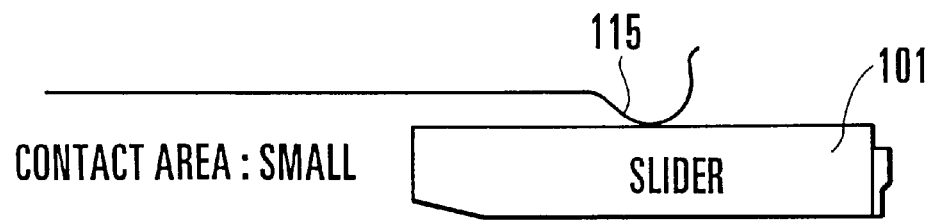
Figure 2B:
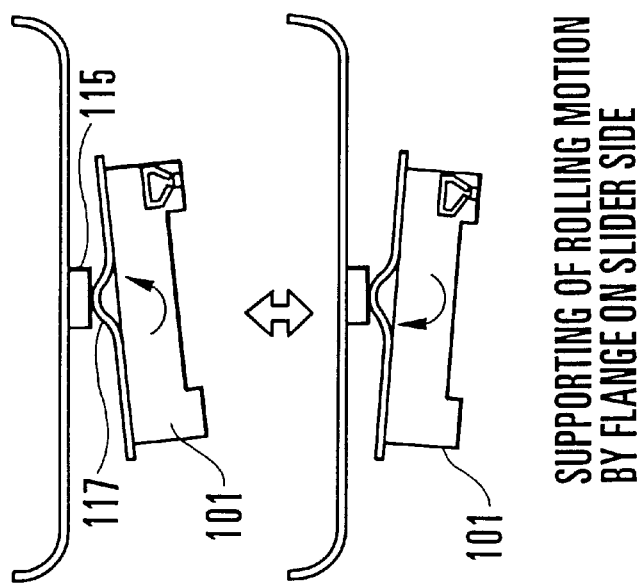
FIGS. 2A and 2B views for explaining slider motions associated with the function of the present invention.
Figure 2A:
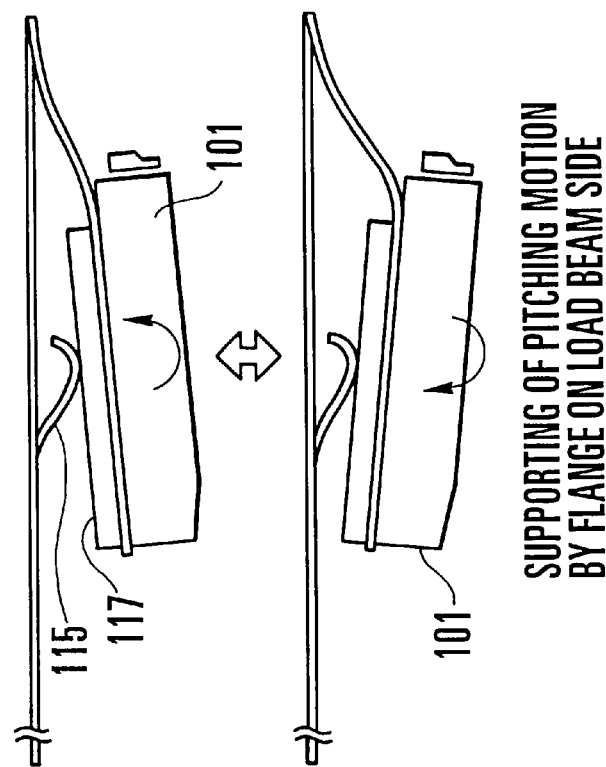

Since the above slider motions can be separated into a pitching motion on a convex member (on the load beam side) as an axis which crosses the longitudinal direction of the slider and a rolling motion on a convex member (on the slider side) as an axis which is parallel to the longitudinal direction of the slider, as shown in FIGS. 2A and 2B, good vibration characteristics with little coupled vibration can be obtained.

Figure 34:
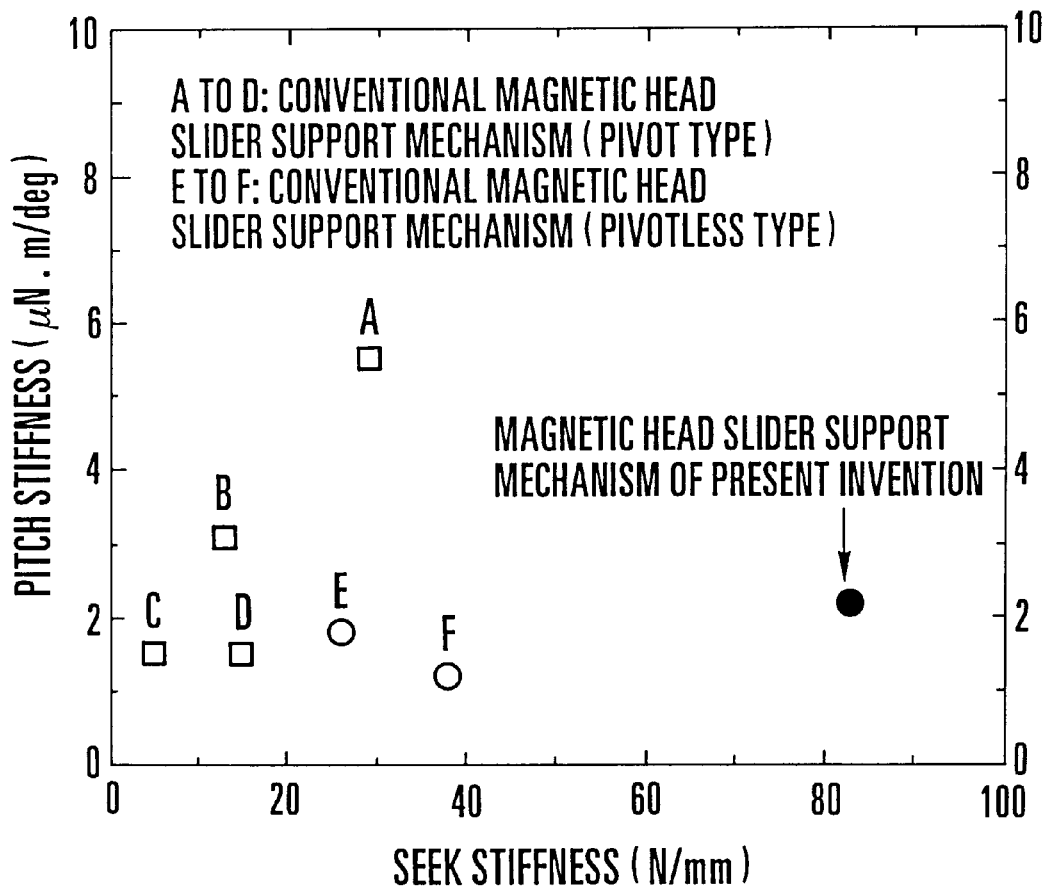
FIG. 34 is a graph showing the spring characteristics of the slider support mechanism of the present invention.
Figure 35:
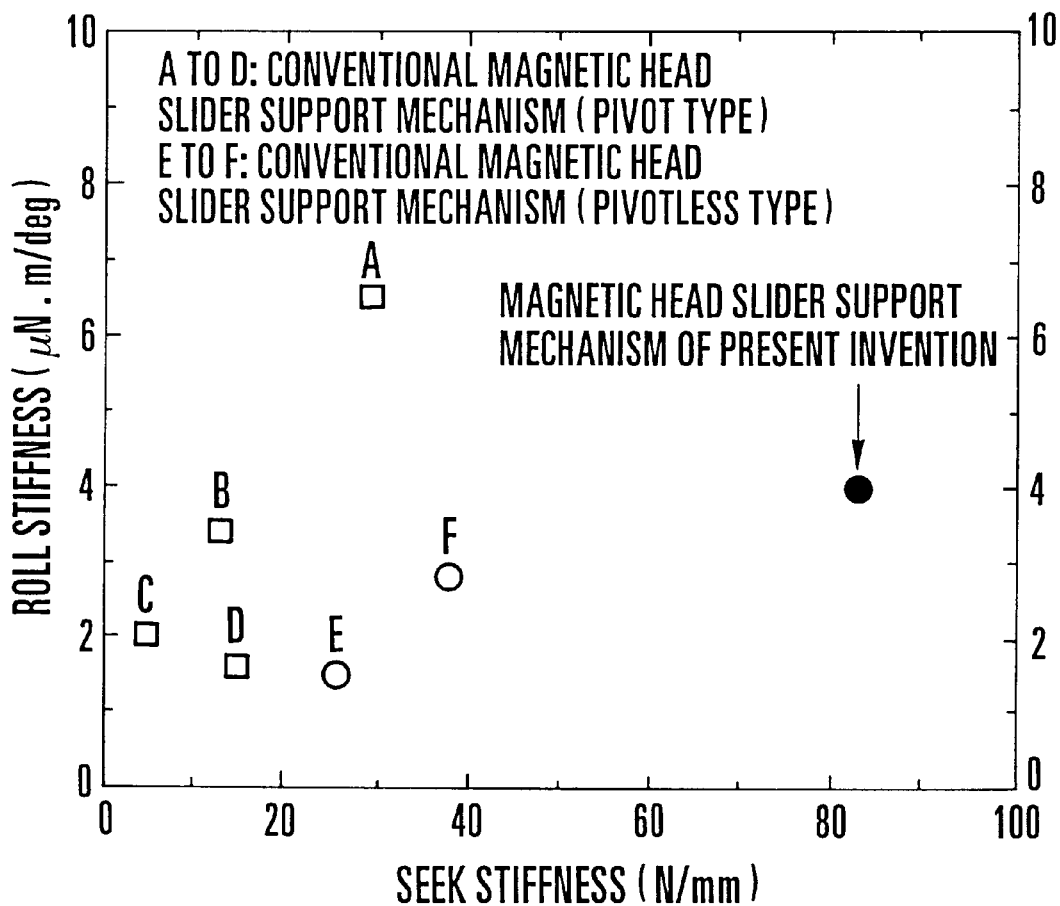
FIG. 35 is a graph showing the spring characteristics of the slider support mechanism of the present invention.
Figure 36:
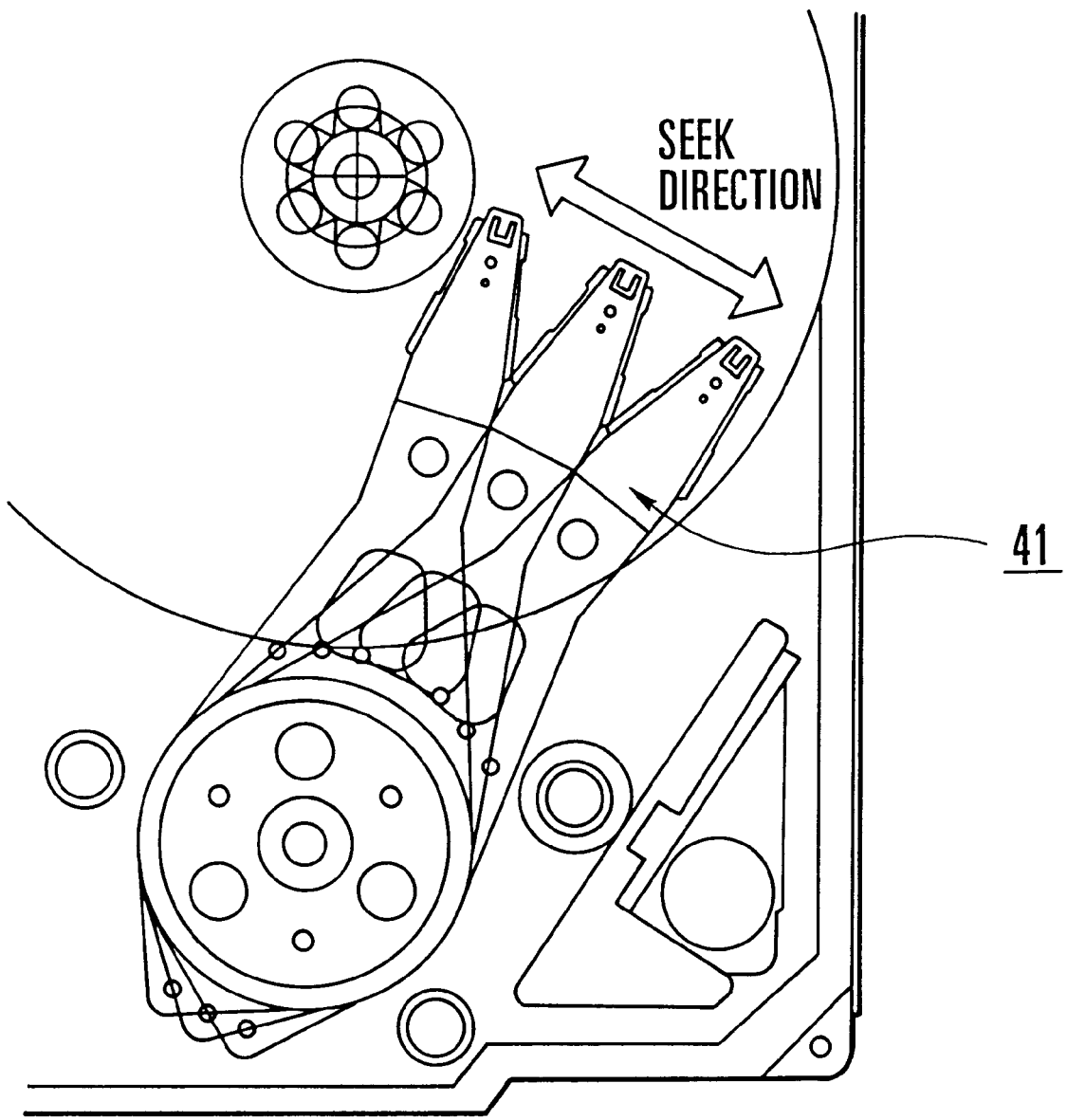
FIG. 36 is a view for explaining a conventional rotary actuator type slider support mechanism.
Figure 37A:
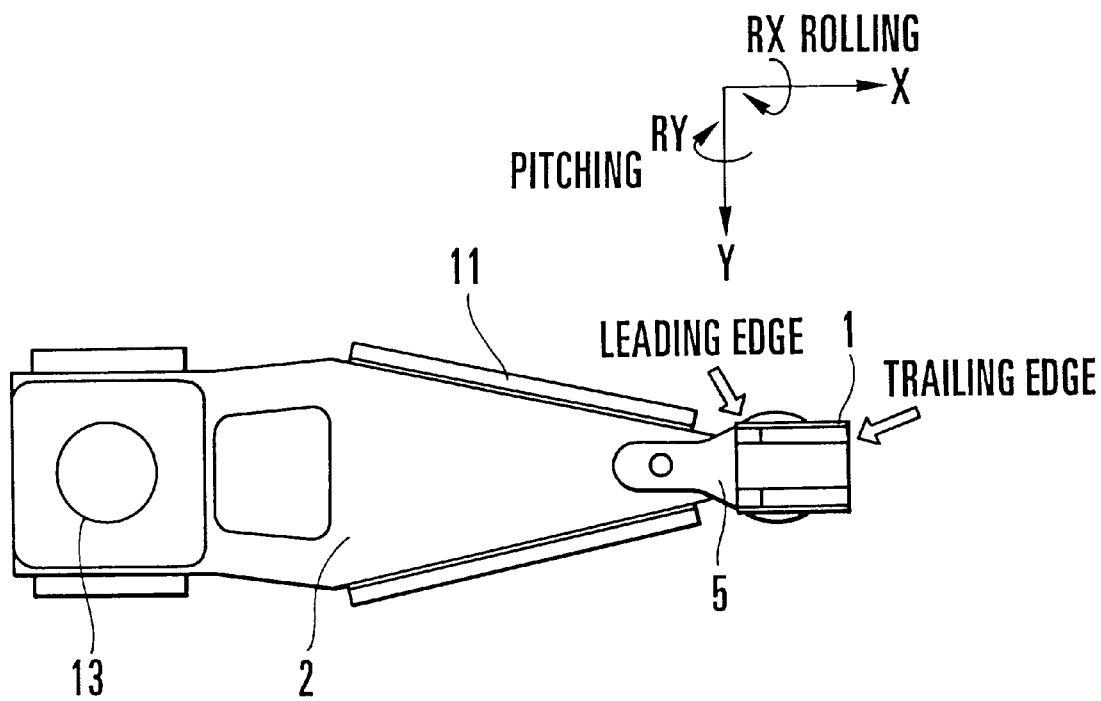
FIGS. 37A and 37B are views showing the structure of a conventional slider support mechanism.
Figure 37B:
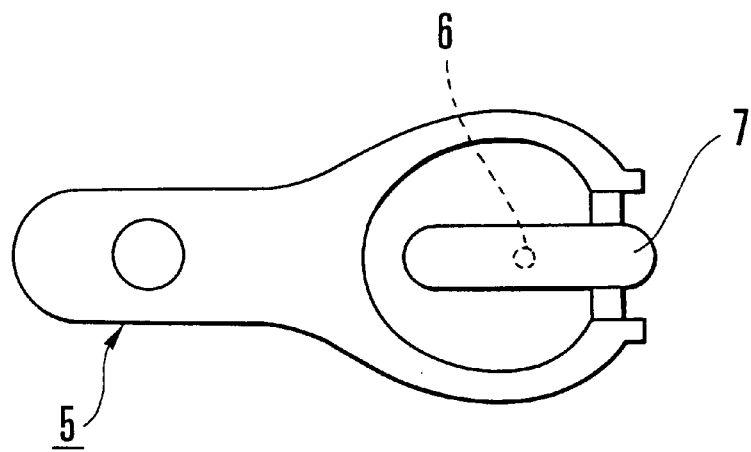
Figures 38A, 38B:
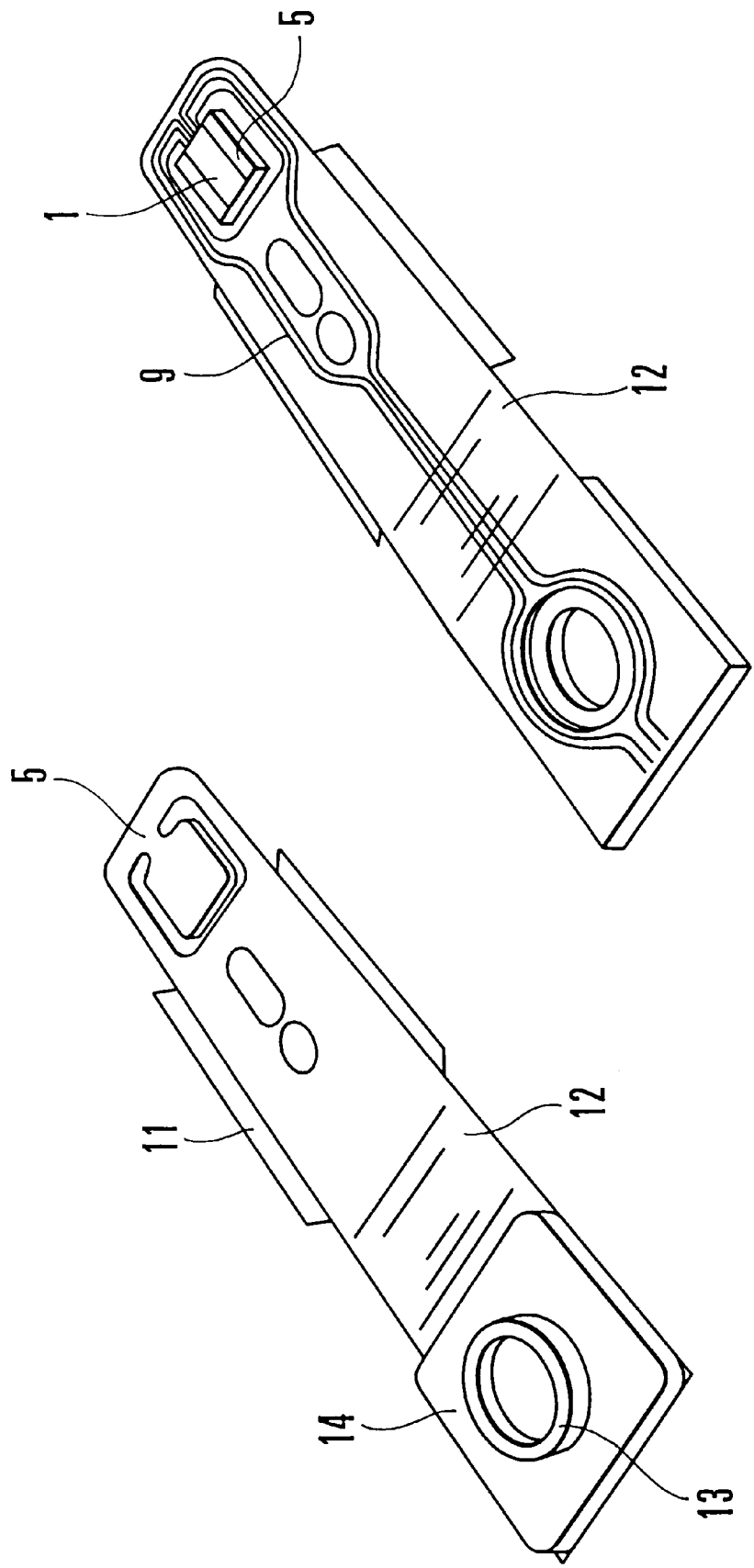
FIGS. 38A and 38B are views showing a conventional wire-integrated type suspension.
Figure 39A:
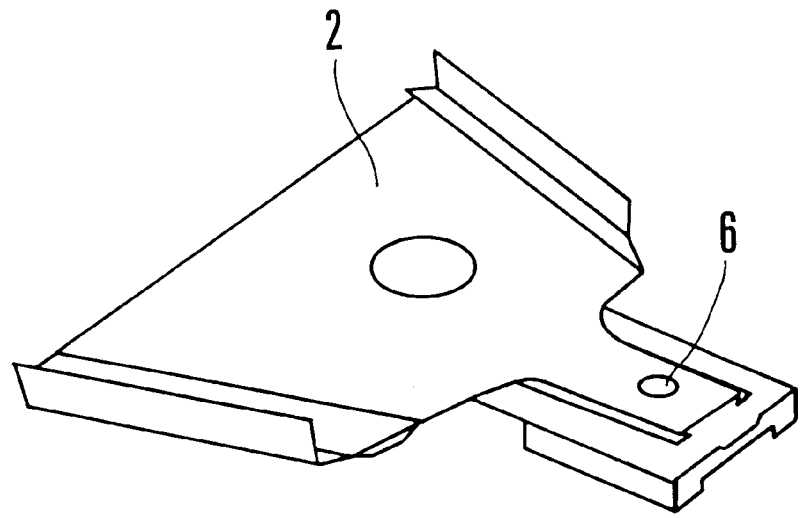
FIGS. 39A and 39B are views respectively showing examples of the flexure of a conventional slider support mechanism.
Figure 39B:
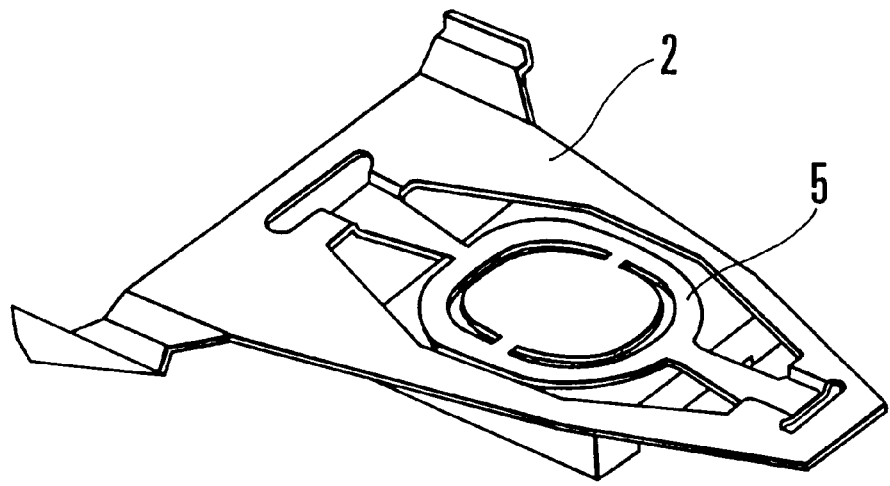
Figure 40:
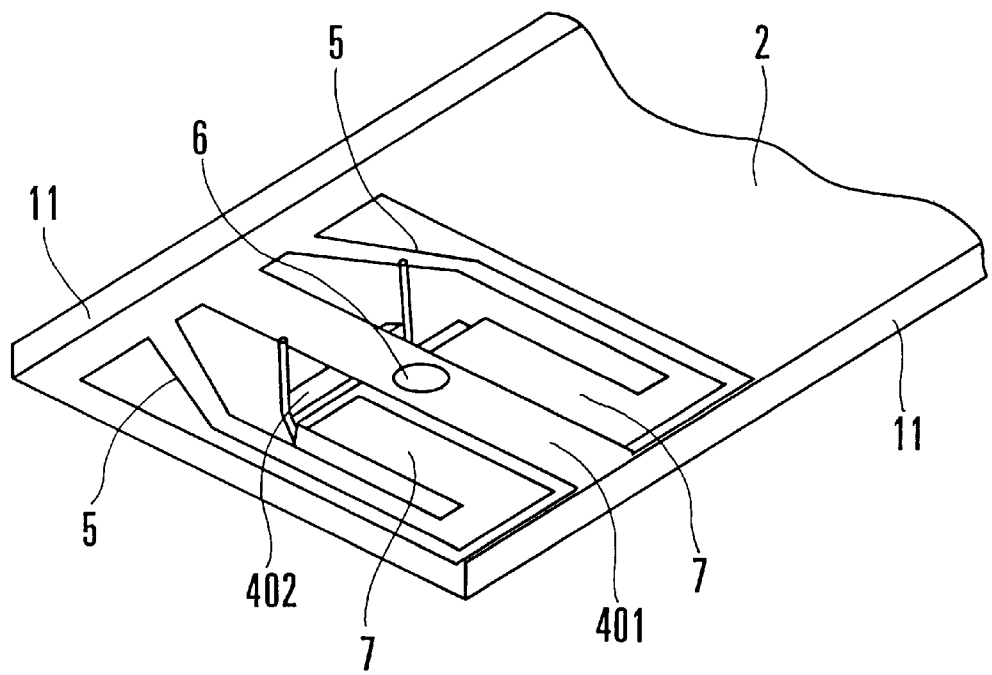
FIG. 40 is a perspective view showing the structure of a conventional slider support mechanism.
Figure 40:
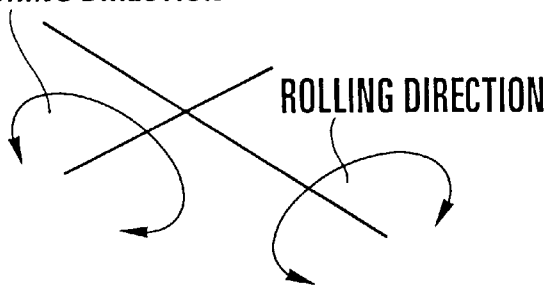
Figure 41:
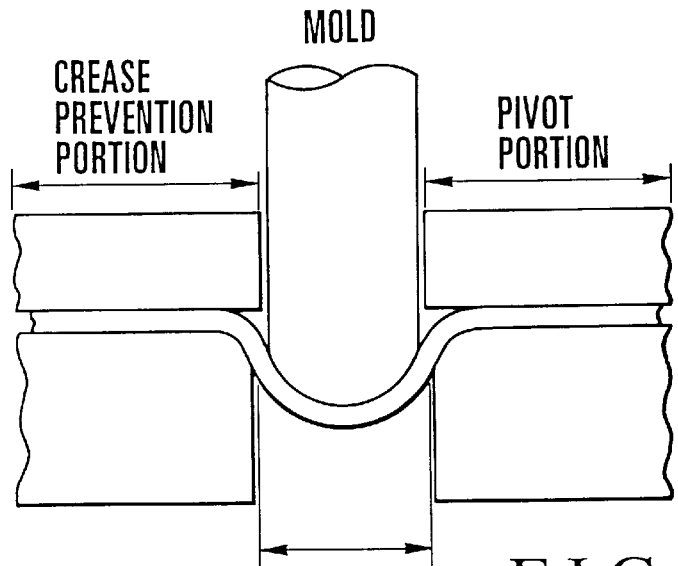
FIG. 41 is a view showing a problem posed in the conventional slider support mechanism.
Figure 42A:
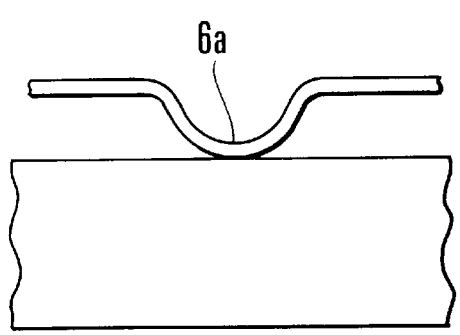
FIGS. 42A and 42B are views showing problems posed in the conventional slider support mechanisms.
Figure 42B:
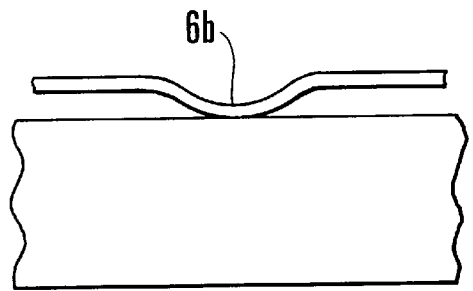
Figure 43:
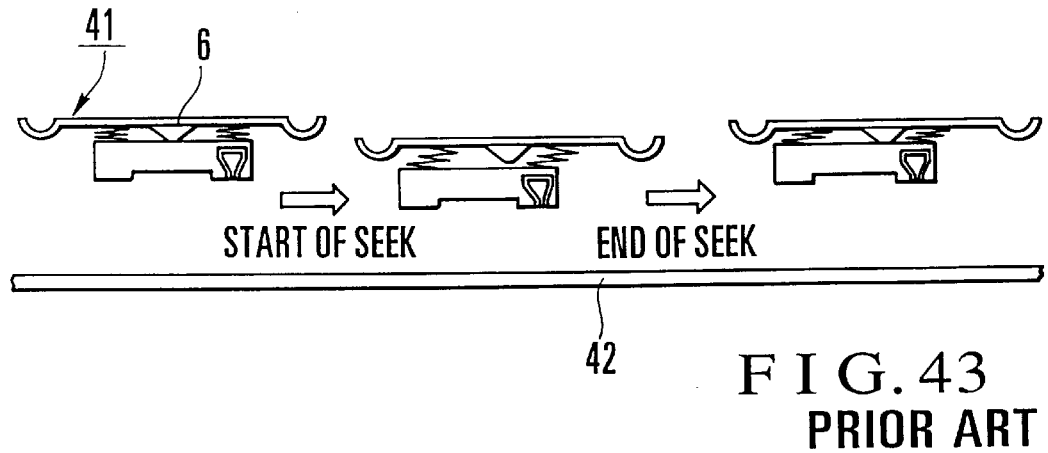
FIG. 43 is a view showing a problem posed in the conventional slider support mechanism.

FIGS. 34 and 35 show simulation analysis results associated with the slider support mechanism using the E-shaped flexure 105. FIG. 34 shows the correlation between the seek stiffness and the roll stiffness. FIG. 35 shows the correlation between the seek stiffness and the roll stiffness. Referring to FIGS. 34 and 35, "A" to "D" indicate the results obtained by analysis on the conventional pivot type magnetic head slider support mechanism shown in FIGS. 37A and 37B, and "E" and "F" indicate the results obtained by analysis on the conventional pivotless type slider support mechanism shown in FIGS. 39A and 39B. The bullets indicate the results obtained by analysis on the slider support mechanism of the present invention. As is obvious from FIGS. 34 and 35, the slider support mechanism of the structure of the present invention obtains both a low slider support stiffness (roll/pitch stiffness) and a high seek stiffness at once as compared with the conventional slider support mechanisms.

According to the slider support mechanism of the present invention, the load beam and the flexure can be integrally formed, and the slider can be held and pressed by a point-support scheme. For this reason, there is provided a magnetic head slider support mechanism which allows a reduction in size and exhibits high productivity while keeping the degree of freedom in wiring of a wire-integrated type suspension high. In addition, an off-track error due to slipstick can be prevented. Furthermore, the mechanism of the present invention can obtain a lower slider support stiffness (roll/pitch stiffness) and a higher seek stiffness than the conventional mechanisms.

What is claimed is:

1. A magnetic head slider support mechanism comprising:
   a flexure for supporting a slider on which a magnetic head is mounted;
   a load beam having one end connected to an actuator mechanism and the other end having said flexure and applying a load force to said slider, said load beam and said flexure being integrally formed by using one thin strip plate; and
   a tongue member bent from said strip plate, said tongue member having a base connected to said strip plate and a U-shaped end portion, wherein a base of said U-shaped end portion is in contact with a rear surface of said slider to support said slider.

2. A mechanism according to claim 1, wherein said tongue member is bent toward said slider at a boundary position where said load beam is continuous with said flexure.

3. A mechanism according to claim 1, wherein said tongue member is bent toward said slider at a distal end portion of a region where said load beam is surrounded by said flexure.

4. A mechanism according to claim 3, wherein said load beam has one of a W-shaped cutting and an H-shaped cutting formed in a distal end portion thereof to have a convex stage portion projecting to a trailing edge side of said slider, and
   said flexure is formed to surround said convex stage portion.

5. A mechanism according to claim 4, wherein said tongue member is formed on said convex stage portion.

6. A mechanism according to claim 1, wherein said load beam further comprises
   a pair of base arms extending from left and right ends of the distal end portion toward a tailing edge side of said slider and then extending toward a central portion of said load arm to be coupled to each other,
   one connect arm extending from a coupling portion of said base arms toward the trailing edge side of said slider along a center line of said load beam, and
   a mount stage formed by separating a distal end portion of said connect arm into right and left portions and extending the portions toward one end of each of said base arms, and
   said flexure is formed into an E shape on the trailing edge side of said slider with respect to the coupling portion of said base arms by using said connect arm and said mount stage.

7. A mechanism according to claim 6, wherein said tongue member is bent from the coupling portion of said base arms toward said slider.

8. A mechanism according to claim 1, further comprising a single connect arm extending from said flexure toward said load beam, said connect arm being formed along a longitudinal axis of said load beam.

9. A magnetic disk storage comprising:
   a magnetic disk;
   a magnetic head which is relatively moved in tight contact with said magnetic disk to record/reproduce information;
   a slider on which said magnetic head is mounted; and
   a slider support mechanism for pressing said slider against said magnetic disk;
   said slider support mechanism including:
      a flexure for supporting said slider;
      a load beam having one end connected to an actuator mechanism and the other end having said flexure and applying a load force to said slide, said load beam and said flexure being integrally formed by using one thin strip plate;

a support member, for supporting a rear surface of said slider, bent from said strip plate, said support member having a base connected to said strip plate and a U-shaped end portion, wherein a base of said U-shaped end portion is in contact with said rear surface of said slider to support said slider; and a single connect arm extending from said flexure toward said load beam, said connect arm being formed along a longitudinal axis of said load beam.

10. A magnetic head slider support mechanism comprising:

a flexure for supporting a slider on which a magnetic head is mounted;

a load beam having one end connected to an actuator mechanism and the other end having said flexure and applying a load force to said slider, said load beam and said flexure being integrally formed by using one thin strip plate; and a tongue member having a U-shaped cross-section and bent from said strip plate toward said slider supported by said flexure, said tongue member having a distal end being in contact with a rear surface of said slider to support said slider;

wherein said load beam further comprises:

a pair of base arms extending from left and right ends of the distal end portion toward a trailing edge side of said slider and then extending toward a central portion of said load arm to be coupled to each other;

one connect arm extending form a coupling portion of said base arms toward the trailing edge side of said slider along a center line of said load beam;

a mount stage formed by separating a distal end portion of said connect arm into right and left portions and extending the portions toward one end of each of said base arms; and said flexure is formed into an E shape on the trailing edge side of said slider with respect to the coupling portion of said base arms by using said connect arm and said mount stage.

11. A mechanism according to claim 10, wherein said tongue member is bent from the coupling portion of said base arms toward said slider.

* * * * *